(12) United States Patent
Kumano et al.

(10) Patent No.: US 8,078,387 B2
(45) Date of Patent: Dec. 13, 2011

(54) CONTROL APPARATUS FOR SPARK-IGNITION ENGINE

(75) Inventors: Kengo Kumano, Hitachi (JP); Shiro Yamaoka, Hitachi (JP); Hiromu Kakuya, Hitachinaka (JP); Yoshihiro Sukegawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 508 days.

(21) Appl. No.: 12/329,386

(22) Filed: Dec. 5, 2008

(65) Prior Publication Data

US 2009/0150052 A1    Jun. 11, 2009

(30) Foreign Application Priority Data

Dec. 7, 2007   (JP) .................. 2007-316923

(51) Int. Cl.
   *F02B 5/02*   (2006.01)
(52) U.S. Cl. ............... 701/105; 123/299; 123/305
(58) Field of Classification Search ............ 123/299, 123/305; 701/105
   See application file for complete search history.

(56) References Cited

U.S. PATENT DOCUMENTS

| | | | | |
|---|---|---|---|---|
| 6,659,073 B1* | 12/2003 | Franke et al. | ............ | 123/299 |
| 6,691,671 B2* | 2/2004 | Duffy et al. | ............ | 123/299 |
| 7,194,996 B2* | 3/2007 | Koopmans | ............ | 123/295 |
| 7,284,531 B2* | 10/2007 | Brachert et al. | ............ | 123/295 |
| 7,314,036 B2* | 1/2008 | Altenschmidt | ............ | 123/299 |
| 7,681,550 B2* | 3/2010 | Kobayashi | ............ | 123/299 |
| 2001/0056322 A1* | 12/2001 | Yoshizawa et al. | ............ | 701/104 |
| 2004/0129245 A1* | 7/2004 | Hitomi et al. | ............ | 123/299 |
| 2006/0124104 A1* | 6/2006 | Altenschmidt | ............ | 123/299 |
| 2006/0201476 A1* | 9/2006 | Brachert et al. | ............ | 123/299 |
| 2009/0018749 A1* | 1/2009 | Sauer et al. | ............ | 701/103 |

FOREIGN PATENT DOCUMENTS

| | | |
|---|---|---|
| JP | 2006-77711 A | 3/2006 |
| JP | 2006-329158 A | 12/2006 |

* cited by examiner

*Primary Examiner* — Erick Solis

(74) *Attorney, Agent, or Firm* — Crowell & Moring LLP

(57) ABSTRACT

Disclosed herein is a control apparatus for a spark-ignition engine that is capable of avoiding knocking at the time of high-load operation. With this control apparatus, a residual-gas suction unit or the like is not used, an exhaust gas does not deteriorate due to injection in a compression stroke, and a thermal efficiency also does not decrease. An engine control apparatus (ECU) 20 is used for the control of a direct-injection type spark-ignition engine. During the high-load operation of the spark-ignition engine, the ECU 20 injects fuel a plurality of times. In addition, the ECU performs first fuel injection toward internal EGR that exists in a combustion chamber of the spark-ignition engine.

11 Claims, 14 Drawing Sheets

CONTROL APPARATUS FOR SPARK-IGNITION ENGINE

BACKGROUND OF THE INVENTION

1. Field of the Invention

The present invention relates to a control apparatus for a spark-ignition engine, and more particularly to a control apparatus that is suitable for achieving a high compression ratio of a direct injection-type spark-ignition engine and the miniaturization thereof.

2. Description of the Related Art

For improvement in the fuel consumption of a spark-ignition engine used for an automobile or the like, the achievement of a high compression ratio of the engine and the miniaturization (downsizing) of the engine are attracting increasing attention. The fuel consumption of engines can be improved by achieving a high compression ratio to enhance the theoretical thermal efficiency, and by combining supercharging with downsizing to reduce the pumping loss and friction. However, since these engines are subjected to high temperature and high pressure inside a combustion chamber during a compression-expansion stroke in comparison with usually used engines, undesired knocking would easily occur at the time of high-load operation.

Usually, in order to avoid knocking, the ignition timing is retarded (shifted to the retarded angle side) at the time of high-load operation so as to prevent the temperature and pressure inside a combustion chamber from becoming high. However, in this case, the difference between the optimum ignition timing at which the thermal efficiency is the highest and the actual ignition timing becomes large, which leads to a decrease in thermal efficiency. As a result, an effect of improving the fuel consumption, which is primarily produced by the high compression ratio and downsizing, cannot be achieved.

A first known technique for avoiding knocking at the time of high-load operation includes the steps of: providing a combustion chamber with a residual-gas sucking unit; and at the time of high-load operation, sucking a residual gas whose temperature is high so that the increase in compression end temperature inside the combustion chamber is suppressed, which makes it possible to avoid knocking without decreasing the thermal efficiency (for example, refer to JP-A-2006-77711).

A second known technique includes the steps of: when knocking is detected, injecting fuel in a plurality of parts (partially injecting fuel a plurality of times) in a direct injection (DI) engine; and carrying out at least one fuel injection in a compression stroke to make maximum use of an evaporative cooling effect produced by cylinder injection, which makes it possible to avoid knocking (for example, refer to JP-A-2006-329158).

SUMMARY OF THE INVENTION

However, because the technique disclosed in JP-A-2006-77711 requires the residual-gas suction unit, this technique is not practically used.

In addition, according to the technique disclosed in JP-A-2006-329158, because injection in a compression stroke is stratified charge, the soot volume increases. This causes an exhaust gas to become worse.

The temperature and pressure of part of an unburnt mixture gas (end gas) increase during flame propagation and the part of the unburnt mixture gas is autoignited, as a result of which a spark-ignition engine undesirably generates knocking. Therefore, when the temperature inside the combustion chamber is not uniform, knocking will occur at a location at which the temperature is higher (hot spot).

One of major causes of the lack of uniformity in the temperature inside the combustion chamber is the existence of internal EGR (Exhaust Gas Recirculation), that is, high temperature residual gas. It is extremely difficult to completely mix the internal EGR with air to homogenize a mixture gas existing in the combustion chamber during a period of time from an intake stroke up to a compression stroke. Therefore, a hot spot is generated in an end gas unit at the time of flame propagation, which causes knocking to occur. Specifically, in order to improve the antiknock property of a spark ignition engine, it is important to eliminate a hot spot caused by the internal EGR.

In order to achieve the highest cooling effect for a DI engine provided by vaporization latent heat of fuel, it is effective to inject the fuel at the end of an intake stroke or in a compression stroke. However, in this case, the fuel is injected toward a mixture gas of air and internal EGR. Accordingly, although an effect of decreasing the average temperature of the mixture gas is large, it is difficult to eliminate a hot spot that causes knocking.

An object of the present invention is to provide a control apparatus for a spark-ignition engine that is capable of avoiding knocking at the time of high-load operation. With this control apparatus, a residual-gas suction unit or the like is not used, an exhaust gas does not deteriorate due to injection in a compression stroke, and a thermal efficiency also does not decrease.

(1) In order to achieve the above object, according to one aspect of the present invention, there is provided a control apparatus for a direct injection type spark-ignition engine, the control apparatus comprising: control means for performing control so that fuel is injected dividedly at a plurality of times during the high-load operation of the spark-ignition engine, wherein first fuel injection is performed toward gas of internal exhaust gas recirculation which exists in a combustion chamber of the spark-ignition engine.

The above-described configuration makes it possible to avoid knocking at the time of high-load operation without using a residual-gas suction unit, or the like, without causing an exhaust gas to deteriorate due to injection in a compression stroke, and without decreasing the thermal efficiency.

(2) In the above-described item (1), preferably, the control means performs control so that the first fuel injection starts at a crank angle ranging from −15° to +15° with reference to a top dead center at which an exhaust stroke ends.

(3) In the above-described item (1), preferably, the spark-ignition engine includes a variable valve actuator which is capable of controlling the opening and closing timing of an intake valve or an exhaust valve, the control means controls the variable valve actuator such that a valve overlap period during which both the intake valve and the exhaust valve open is provided during the high-load operation of the spark-ignition engine, and the control means performs control such that the first fuel injection is started at a point of time close to a top dead center at which an exhaust stroke ends.

(4) In the above-described item (1), preferably, the spark-ignition engine includes a variable valve actuator which is capable of controlling the opening and closing timing of an intake valve or an exhaust valve, the control means controls the variable valve actuator such that a valve overlap period during which both the intake valve and the exhaust valve open is provided during the high-load operation of the spark-ignition engine, and the control means performs control such that the first fuel injection is started after the exhaust valve closes.

(5) In the above-described item (1), preferably, the spark-ignition engine includes a variable valve actuator which is capable of controlling the opening and closing timing of an intake valve or an exhaust valve, the control means controls the variable valve actuator such that a negative valve overlap period during which both the intake valve and the exhaust valve close is provided during the high-load operation of the spark-ignition engine, and wherein the control means performs control such that the first fuel injection is started during the negative valve overlap period.

(6) In the above-described item (5), preferably, the control means controls the variable valve actuator such that the timing at which the intake valve opens is shifted to the retarded angle side with respect to a top dead center to set the negative overlap period on the retarded angle side with respect to the top dead center, and the control means performs control such that the first fuel injection is started during the negative overlap period.

(7) In any one of above-described items (3) through (5), preferably, the spark-ignition engine includes valve timing detection means for detecting a current valve timing, and during the high-load operation of the spark-ignition engine, the control means determines the injection quantity of the first fuel injection on the basis of the valve timing detected by the valve timing detection means.

(8) In the above-described item (7), preferably, during a period of time taken until the current valve timing detected by the valve timing detection means reaches a target value of the valve timing, the control means controls the ignition timing such that the ignition timing is more retarded than a set value of the ignition timing under current operation conditions.

(9) In the above-described item (1), preferably, the high-load operation is one of the following two situations, one being the case where the opening of a throttle provided to control the amount of intake air of the spark-ignition engine is fully opened, the other being the case where the actual ignition timing is set on the more retarded angle side than the optimum ignition timing at which the highest thermal efficiency is achieved under current operation conditions.

(10) In the above-described item (1), preferably, the spark-ignition engine includes knocking detection means for detecting knocking, and wherein when based on a result obtained from the knocking detection means the control means judges that knocking is occurring, the control means performs control such that the fuel injection quantity of the first fuel injection is increased.

(11) In the above-described item (10), preferably, when based on a result obtained from the knocking detection means the control means judges that knocking is occurring, the control means performs control such that the fuel injection quantity of the first fuel injection is increased and the negative overlap period is extended.

(12) In order to achieve the above object, according to another aspect of the present invention, there is provided a control apparatus for a direct injection type spark-ignition engine, the control apparatus comprising: control means for performing control so that fuel is injected dividedly at a plurality of times during the high-load operation of the spark-ignition engine, wherein first fuel injection is started at a point of time close to a top dead center at which an exhaust stroke ends, and wherein the injection of the whole amount of fuel required for one combustion cycle is completed before the timing at which an intake valve closes.

The above-described configuration makes it possible to avoid knocking at the time of high-load operation without using a residual-gas suction unit, or the like, without causing an exhaust gas to deteriorate due to injection in a compression stroke, and without decreasing the thermal efficiency.

(13) In order to achieve the above object, according to still another aspect of the present invention, there is provided a control apparatus for a direct injection type spark-ignition engine, the control apparatus comprising: control means for performing control so that fuel is injected dividedly at a plurality of times during the high-load operation of the spark-ignition engine, wherein first fuel injection is started at a point of time close to a top dead center at which an exhaust stroke ends.

The above-described configuration makes it possible to avoid knocking at the time of high-load operation without using a residual-gas suction unit, or the like, without causing an exhaust gas to deteriorate due to injection in a compression stroke, and without decreasing the thermal efficiency.

According to the present invention, knocking at the time of high-load operation can be avoided without using a residual-gas suction unit, or the like, without causing an exhaust gas to deteriorate due to injection in a compression stroke, and without decreasing the thermal efficiency.

DESCRIPTION OF THE PREFERRED EMBODIMENTS

The configuration of a control apparatus for a spark-ignition engine according to a first embodiment of the present invention, and the operation thereof, will be described below with reference to FIGS. 1 through 7.

First of all, the configuration of a system in which the control apparatus for the spark-ignition engine according to this embodiment is applied to an automobile gasoline engine will be described with reference to FIG. 1.

Figure 1:
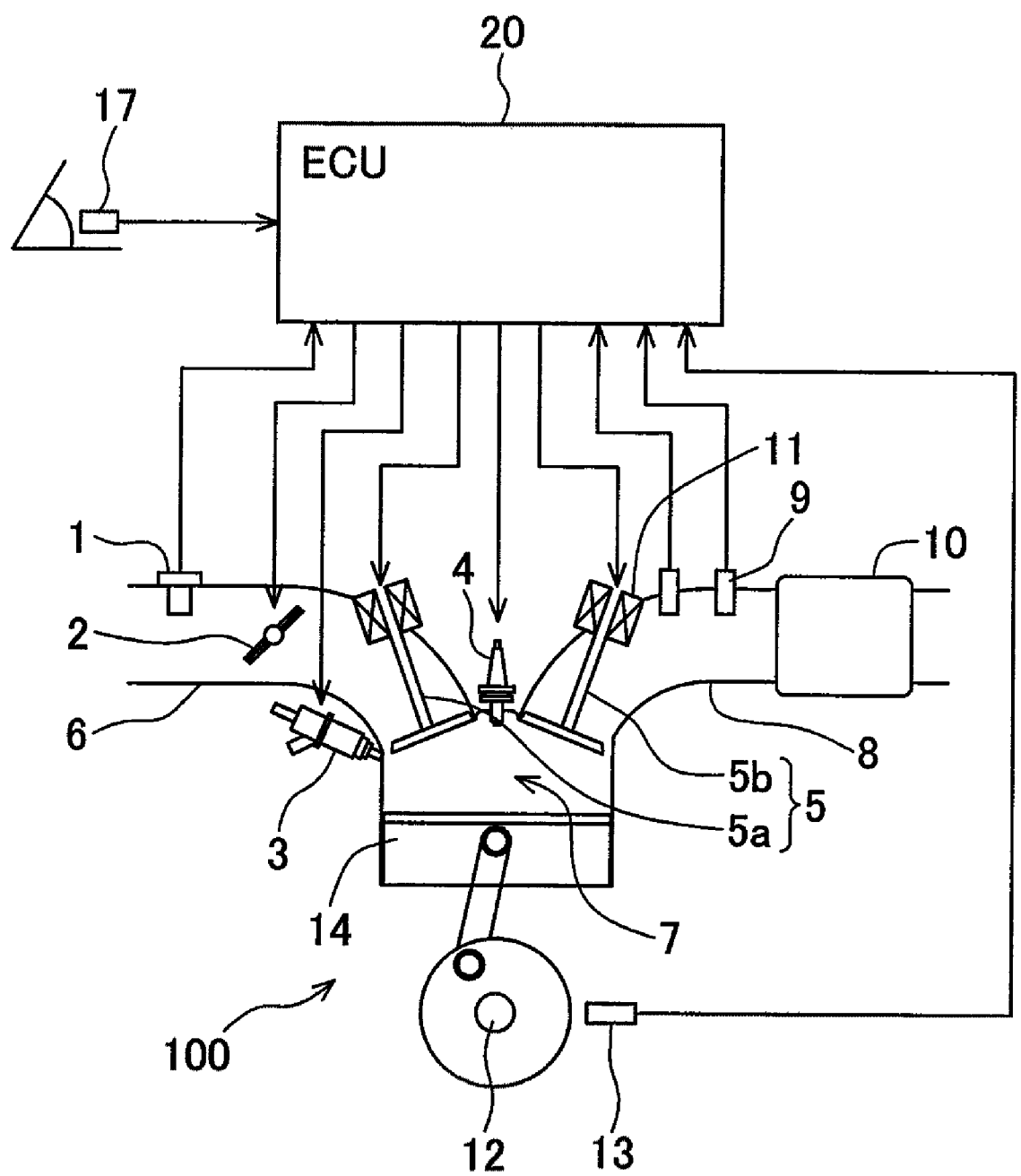
FIG. 1 is a diagram illustrating the configuration of a system in which a control apparatus for a spark-ignition engine according to a first embodiment of the present invention is applied to an automobile gasoline engine.

FIG. 1 is a diagram illustrating the configuration of the system in which the control apparatus for the spark-ignition engine according to the first embodiment of the present invention is applied to the automobile gasoline engine.

An engine 100 is an automobile gasoline engine that performs spark-ignition combustion. The engine 100 includes an intake pipe 6 having an airflow sensor 1 for measuring the amount of intake air and an electronic control throttle 2 for adjusting an intake flow rate. Each of the airflow sensor 1 and the electronic control throttle 2 is disposed at a proper position of the intake pipe 6. The engine 100 further includes a cylinder 7 having an injector 3 for injecting fuel into a combustion chamber that is surrounded by the cylinder 7 and a piston 14 and a spark plug 4 for supplying ignition energy. Each of the injector 3 and the spark plug 4 is disposed at a proper position of the cylinder 7. The engine 100 further includes a variable valve 5 that is constituted of an intake valve 5a for adjusting an intake gas taken in the pipe, and an exhaust valve 5b for adjusting an exhaust gas exhausted from the pipe. Each of the intake valve 5a and the exhaust valve 5b is disposed at a proper position of the cylinder 7. The amount of EGR in the pipe is controlled by adjusting the variable valve 5.

In addition, the engine 100 further includes an exhaust pipe 8 that has a three-way catalyst 10 for cleaning up exhaustion; an air-fuel ratio sensor 9 for detecting an air-fuel ratio of the exhaustion on the upstream side of the three-way catalyst 10, which is one mode of an air-fuel ratio detector; and an exhaust-gas temperature sensor 11 for measuring the temperature of the exhaustion on the upstream side of the three-way catalyst 10, which is one mode of an exhaust-gas temperature detector. Each of the three-way catalyst 10, the air-fuel ratio sensor 9, and the exhaust-gas temperature sensor 11 is disposed at a proper position of the exhaust pipe 8. Moreover, the engine 100 further includes a crank shaft 12 that is provided with a crank angle sensor 13 for calculating a rotation angle. Additionally, the engine 100 further includes a swirl valve 15 that is capable of adjusting the flow strength of a mixture gas formed in the combustion chamber.

Signals obtained from the airflow sensor 1, the air-fuel ratio sensor 9, the exhaust-gas temperature sensor 11, and the crank angle sensor 13 are transmitted to an engine control apparatus (ECU) 20. In addition, a signal obtained from an accelerator opening angle sensor 17 is transmitted to the ECU 20. The accelerator opening angle sensor 17 detects the extent to which an accelerator pedal is pressed down (that is, the accelerator opening). The ECU 20 calculates the requested torque on the basis of an output signal of the accelerator opening angle sensor 17. To be more specific, the accelerator opening angle sensor 17 is used as a requested torque detection sensor for detecting the requested torque for the engine. In addition, the ECU 20 calculates the rotational speed of the engine on the basis of an output signal of the crank angle sensor 13. On the basis of an operational state of the engine obtained from the output of the various kinds of sensors described above, the ECU 20 optimally calculates an air flow rate, the fuel injection quantity, and the amount of main operation of the engine in the ignition timing.

The fuel injection quantity calculated by the ECU 20 is converted into an open-valve pulse signal. The open-valve pulse signal is then transmitted to the injector 3. A spark-plug driving signal is transmitted to the spark plug 4 so that an ignition is made in the ignition timing calculated by the ECU 20. In addition, the throttle opening calculated by the ECU 20 is transmitted to the electronic control throttle 2 as a throttle driving signal. Moreover, the operation amount of the variable valve calculated by the ECU 20 is transmitted to the variable valve 5 as a variable-valve driving signal.

Air flows from the intake pipe 6 into the cylinder 7 through the intake valve 5a. Fuel is injected into the cylinder 7 in which the fuel and air form a mixture gas. The mixture gas explodes when sparks are generated from the spark plug 4 in the specified ignition timing. The combustion pressure of the mixture gas pushes down the piston, which works as the driving force of the engine. Next, an exhaust gas after the explosion is transferred to the three-way catalyst 10 through the exhaust pipe 8. An exhaust-gas composition is cleaned up by the three-way catalyst 10, and is then exhausted to the outside.

Next, the configuration of the control apparatus for the spark-ignition engine according to this embodiment will be described with reference to FIG. 2.

Figure 2:
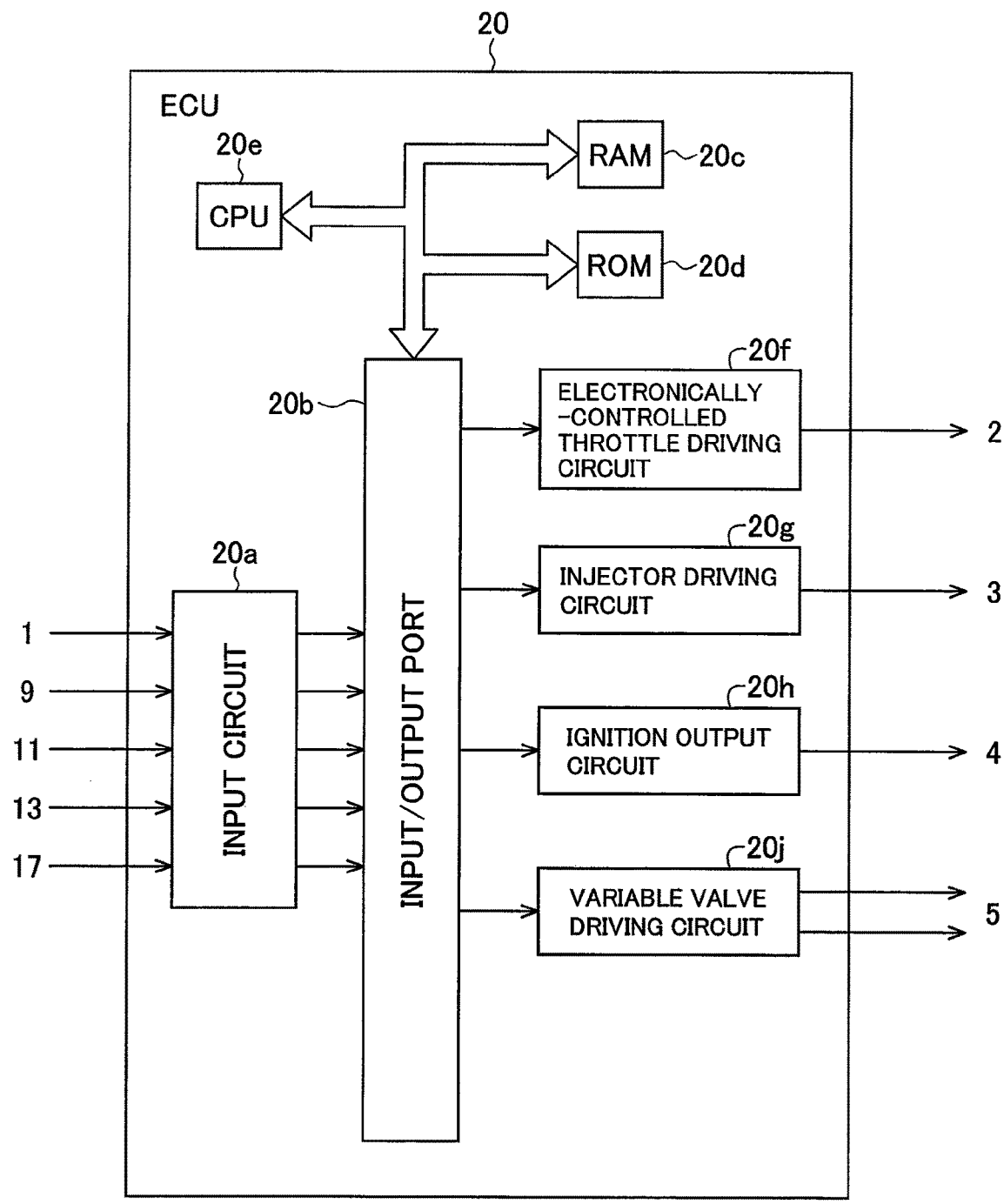
FIG. 2 is a system block diagram illustrating the configuration of the control apparatus for the spark-ignition engine according to the first embodiment of the present invention.

FIG. 2 is a system block diagram illustrating the configuration of the control apparatus for the spark-ignition engine according to the first embodiment of the present invention.

Output signals from the airflow sensor 1, the air-fuel ratio sensor 9, the exhaust-gas temperature sensor 11, and the crank angle sensor 13 are inputted into an input circuit 20a of the ECU 20. However, the input signals are not limited to them. The input signals inputted from the sensors are sent to an input port included in an input-output port 20b. Values sent to the input port 20b are stored in a RAM 20c. The values are subjected to arithmetic processing by a CPU 20e. A control program which describes the arithmetic processing is written to a ROM 20d beforehand.

Values, each of which indicates the operation amount of each actuator, are calculated according to the control program. The calculated values are stored in the RAM 20c, and are sent to an output port included in the input-output port 20b. The values are then sent to each actuator through each corresponding driving circuit. With this embodiment, the driving circuits are an electronic control throttle driving circuit 20f, an injector driving circuit 20g, an ignition output circuit 20h, and a variable valve driving circuit 20j. The driving circuits control the electronic control throttle 2, the injector 3, the spark plug 4, and the variable valve 5 respectively. According to this embodiment, the driving circuits are built into the ECU 20. However, the present invention is not limited to this configuration. Some of the driving circuits may also be disposed outside the ECU 20.

The ECU 20 switches a fuel injection method between a high-load operation area and a normal operation area other than the high-load operation area. Since the high-load fuel injection control is performed in the high-load operation area, knocking is suppressed and the thermal efficiency does not decrease in the ignition retard control. In particular, according to this embodiment, at the time of high-load operation, the ECU 20 injects fuel at a point of time close to a top dead center, and intensively cools the internal EGR whose temperature is high so as to prevent an area inside the combustion chamber from locally becoming high temperature (a hot spot occurs). As a result, knocking at the time of high-load operation can be reduced.

Next, a high-load operation area used by the control apparatus for the spark-ignition engine according to this embodiment will be described with reference to FIG. 3.

Figure 3:
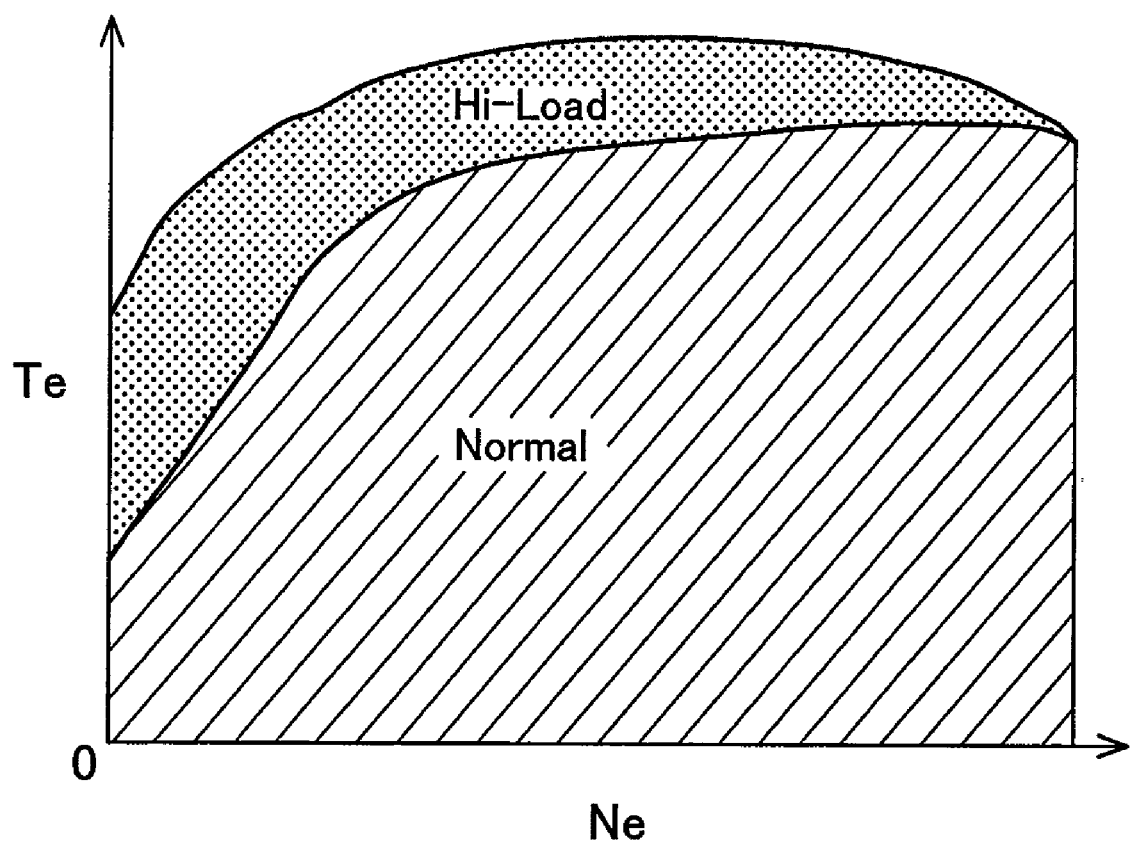
FIG. 3 is a diagram illustrating a high-load operation area used by the control apparatus for the spark-ignition engine according to the first embodiment of the present invention.

FIG. 3 is a diagram illustrating a high-load operation area used by the control apparatus for the spark-ignition engine according to the first embodiment of the present invention.

The high-load operation area Hi-Load is specified beforehand in a map showing the relationship between the engine torque Te and the engine speed Ne. The map is stored in the ROM 20d shown in FIG. 2. The ECU 20 makes a judgment from the engine torque and the engine speed as to whether current operation conditions are associated with the high-load operation area Hi-Load or a normal operation area Normal.

Criteria for specifying this area will be described as below. For example, on the assumption that high-load fuel injection is not performed in all areas, in the normal operation area, the optimum ignition timing (MBT) in which the highest thermal efficiency is achieved under each operation condition is equivalent to the ignition timing that is actually set. In contrast, in the high-load operation area, the optimum ignition timing (MBT) differs from the actually set ignition timing.

The high-load operation is performed when the opening of a throttle used to control the amount of intake air of the spark-ignition engine is fully opened, or when the actual ignition timing is set on the more retarded angle side than the optimum ignition timing at which the highest thermal efficiency is achieved under current operation conditions.

Next, a fuel injection method used by the control apparatus for the spark-ignition engine according to this embodiment will be described with reference to FIGS. 4 through 7.

First, how the fuel injection is controlled by the control apparatus for the spark-ignition engine according to this embodiment will be described with reference to FIG. 4.

Figure 4:
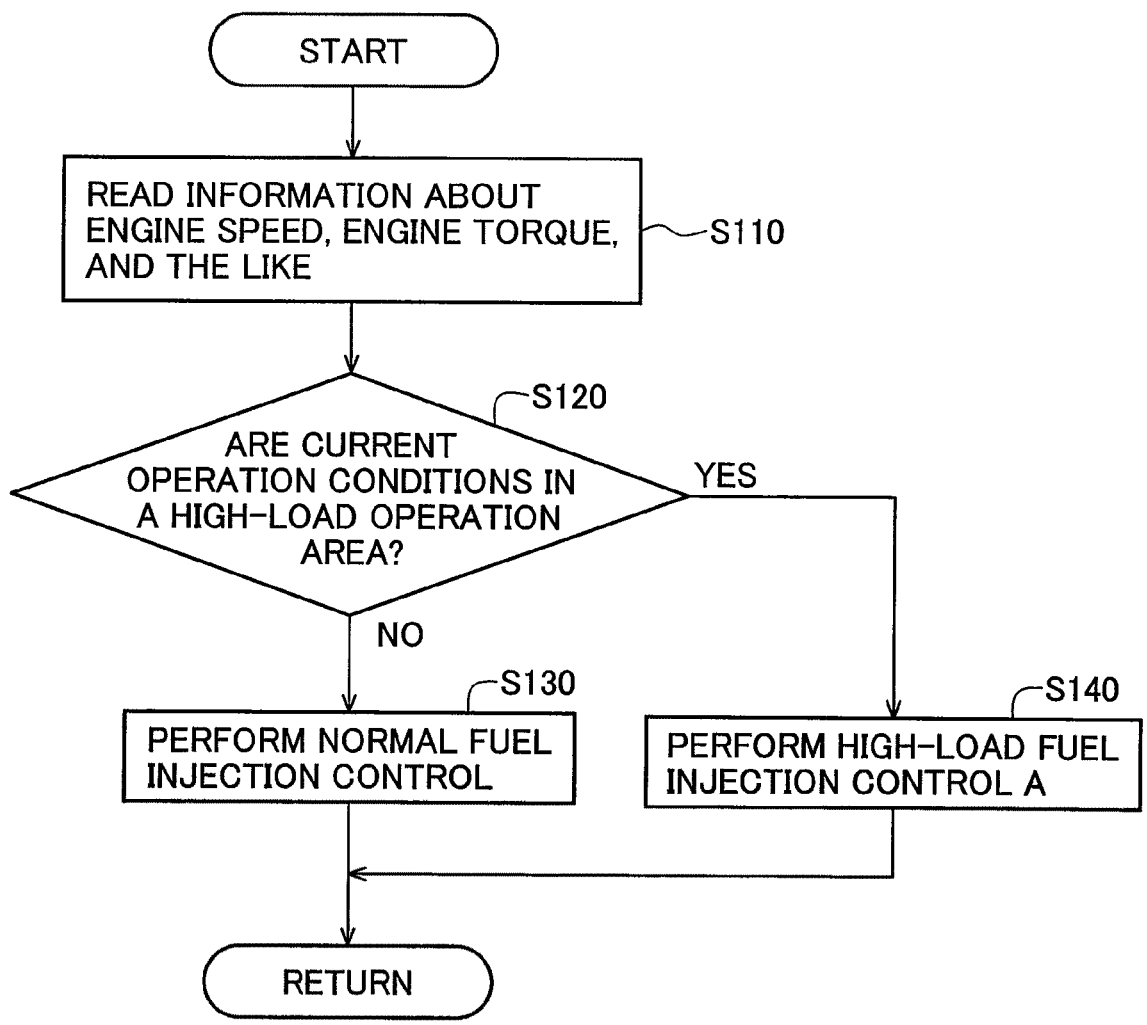
FIG. 4 is a flowchart illustrating how fuel injection is controlled by the control apparatus for the spark-ignition engine according to the first embodiment of the present invention.
Figure 5:
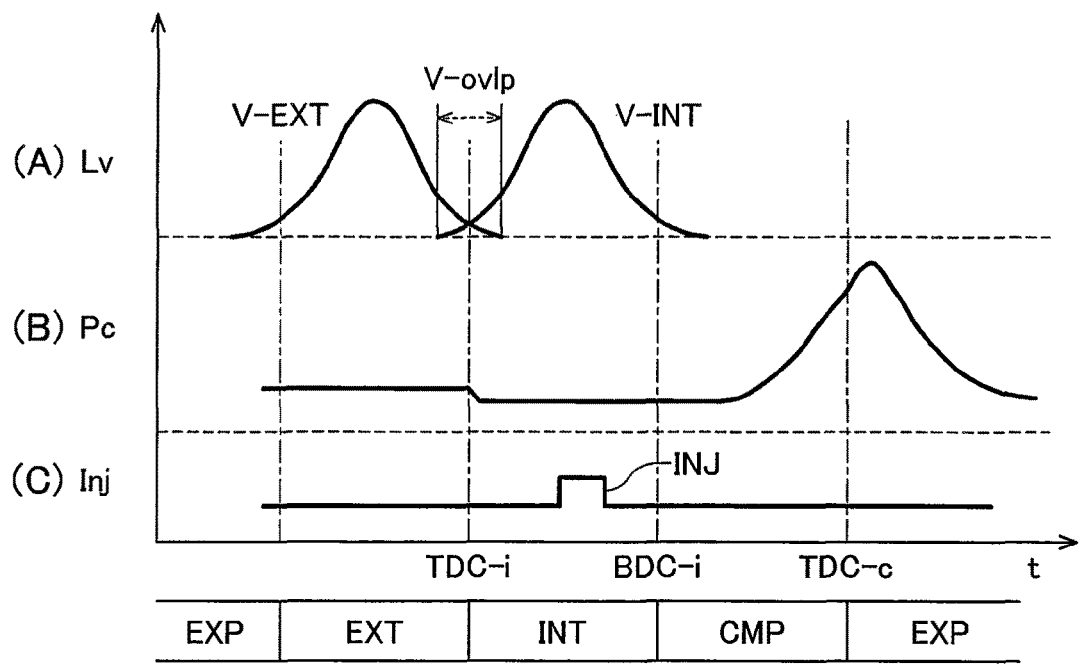
FIGS. 5A through 5C are timing charts each illustrating the fuel injection control for a normal operation area performed by the control apparatus for the spark-ignition engine according to the first embodiment.
Figure 6:
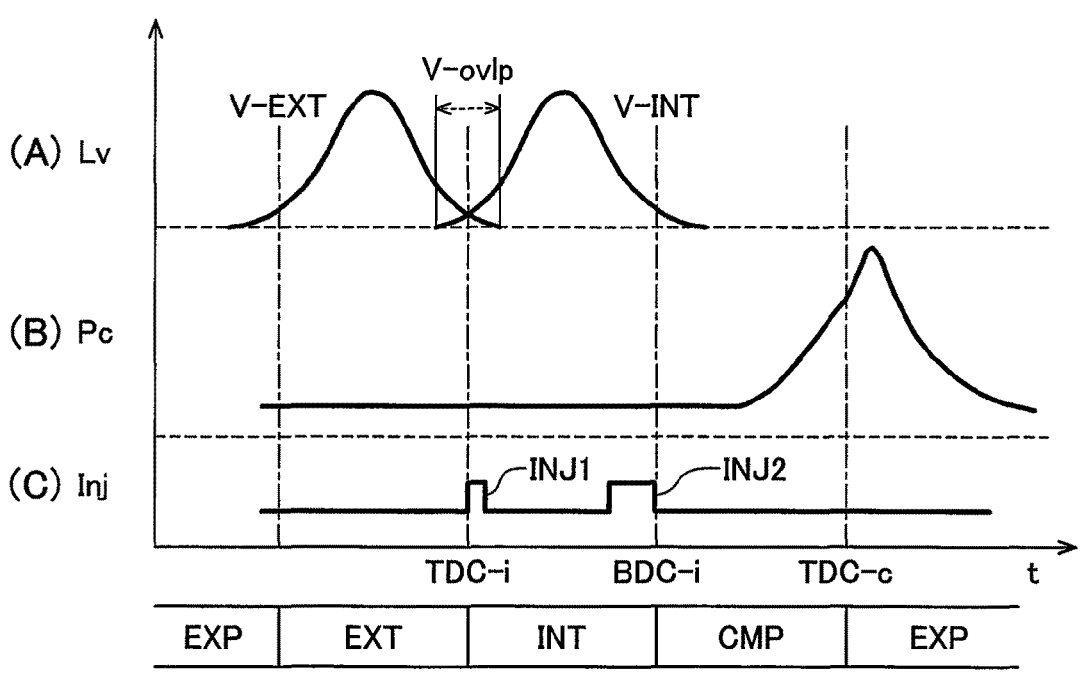
FIGS. 6A through 6C are timing charts each illustrating the fuel injection control for the high-load operation area performed by the control apparatus for the spark-ignition engine according to the first embodiment.

FIG. 4 is a flowchart illustrating how the fuel injection is controlled by the control apparatus for the spark-ignition engine according to the first embodiment of the present invention.

Figure 10:
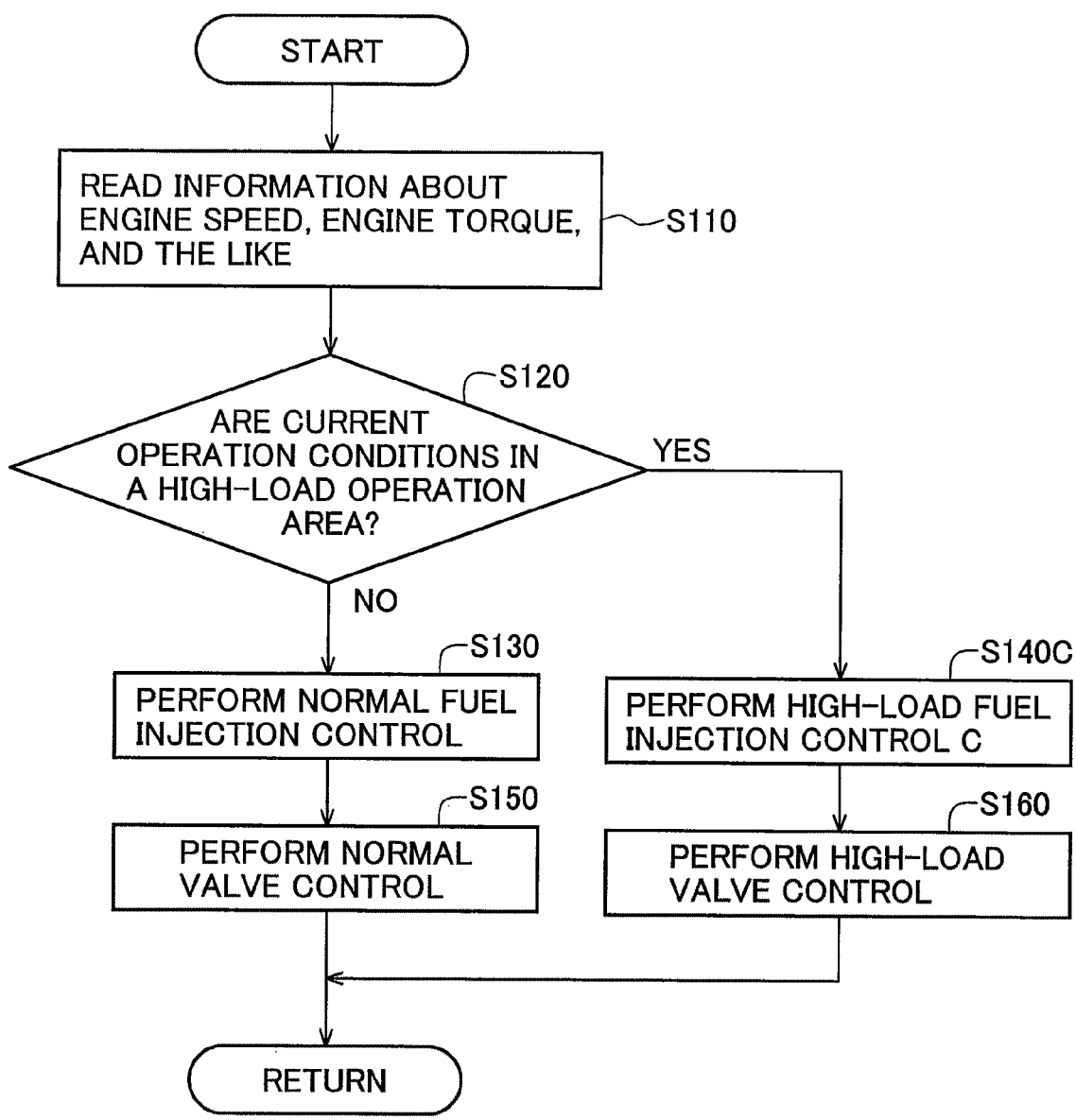
FIG. 10 is a flowchart illustrating how fuel injection is controlled by a control apparatus for a spark-ignition engine according to a third embodiment of the present invention.

The ECU 20 repeats the fuel injection control shown in FIG. 10 in specified cycles.

In a step S110, the ECU 20 reads out information about current engine operation conditions (the engine speed, the engine torque, and the like).

Next, in a step S120, the ECU 20 makes a judgment from the map stored beforehand, or the like, as to whether or not the current operation condition is associated with the high-load operation area. If the current operation conditions do not correspond to the high-load operation area, the ECU 20 judges that the current operation condition is associated with the normal operation area. Accordingly, in a step S130, the ECU 20 performs the normal fuel injection control. The normal fuel injection control will be described later with reference to FIGS. 5A through 5C.

In contrast to this, if it is judged that the current operation condition is associated with the high-load operation area, the ECU 20 performs the high-load fuel injection control A in a step 140. The high-load fuel injection control will be described later with reference to FIG. 6.

Next, the fuel injection control for the normal operation area, which is performed by the control apparatus for the spark-ignition engine according to this embodiment, will be described with reference to FIGS. 5A through 5C.

FIGS. 5A through 5C are timing charts each illustrating the fuel injection control for the normal operation area performed by the control apparatus for the spark-ignition engine according to the first embodiment.

In FIGS. 5A through 5C, a horizontal axis indicates the time t. A vertical axis of FIG. 5A indicates the valve lift amount Lv. Incidentally, in FIG. 5A, a solid line V-EXT indicates the lift amount of the exhaust valve, whereas a solid line V-INT indicates the lift amount of the intake valve. In addition, a period of time during which both the exhaust valve and the intake valve open is a valve overlap period V-ovlp. A vertical axis of FIG. 5B indicates the cylinder inner pressure Pc. A vertical axis of FIG. 5C indicates a fuel injection signal Inj.

As indicated with the solid line V-EXT in FIG. 5A, the exhaust valve starts opening at the end of an expansion stroke (EXP), and closes at the start of an intake stroke (INT). In contrast, as indicated with the solid line V-INT in FIG. 5A, the intake valve starts opening at the end of an exhaust stroke (EXT), and closes at the start of a compression stroke (CMP). Therefore, a valve overlap period V-ovlp during which both the exhaust valve and the intake valve open exists.

A solid line of FIG. 5B indicates a change in cylinder inner pressure Pc.

As shown in FIG. 5C, the ECU 20 performs the normal fuel injection control in the normal operation area. To be more specific, from the viewpoint of ensuring the charging efficiency and the homogenization of a mixture gas, the ECU 20 basically injects fuel in the middle of the intake stroke (INT).

Next, the fuel injection control for the high-load operation area, which is performed by the control apparatus for the spark-ignition engine according to this embodiment, will be described with reference to FIGS. 6A through 6C.

FIGS. 6A through 6C are timing charts each illustrating the fuel injection control for the high-load operation area performed by the control apparatus for the spark-ignition engine according to the first embodiment.

In FIGS. 6A through 6C, a horizontal axis indicates the time t. A vertical axis of FIG. 6A indicates the valve lift amount Lv. Incidentally, in FIG. 6A, a solid line V-EXT indicates the lift amount of the exhaust valve, whereas a solid line V-INT indicates the lift amount of the intake valve. In addition, a period of time during which both the exhaust valve and the intake valve open is a valve overlap period V-ovlp. A vertical axis of FIG. 6B indicates the cylinder inner pressure Pc. A vertical axis of FIG. 6C indicates a fuel injection signal Inj.

As indicated with the solid line V-EXT in FIG. 6A, the exhaust valve starts opening at the end of an expansion stroke (EXP), and closes at the start of an intake stroke (INT). In contrast, as indicated with the solid line V-INT in FIG. 6A, the intake valve starts opening at the end of an exhaust stroke (EXT), and closes at the start of a compression stroke (CMP). Therefore, a valve overlap period V-ovlp during which both the exhaust valve and the intake valve open exists.

A solid line of FIG. 6B indicates a change in cylinder inner pressure Pc.

As shown in FIG. 6C, the ECU 20 performs the high-load fuel injection control A in the high-load operation area. To be more specific, fuel is injected in two parts (in other words, fuel injection is partially performed twice). The start of first-time injection (first injection) INJ1 is set at a point of time close to a top dead center; and the start of second-time injection (second injection) INJ1 is set at a point of time that falls within a range from the middle to the end of the intake stroke. The first injection INJ1 is intended for injection toward internal EGR. The first injection INJ1 produces an evaporative cooling effect that efficiently cools only the internal EGR. As a result, the generation of a hot spot in the combustion chamber can be suppressed. The second injection INJ2 cools a mixture gas of air and the internal EGR to decrease the average temperature in the combustion chamber. In addition, by finishing the injection of the whole amount of required fuel until the intake valve closes, the sufficient charging efficiency (torque) is ensured, and the length of time required to mix the fuel and air is also ensured. As a result, the homogenization of the mixture gas is achieved, which prevents the exhaustion from becoming worse.

Next, a state of the combustion chamber at the time of the first injection corresponding to the high-load operation area will be described with reference to FIG. 7. The first injection is controlled by the control apparatus for the spark-ignition engine according to this embodiment.

Figure 7:
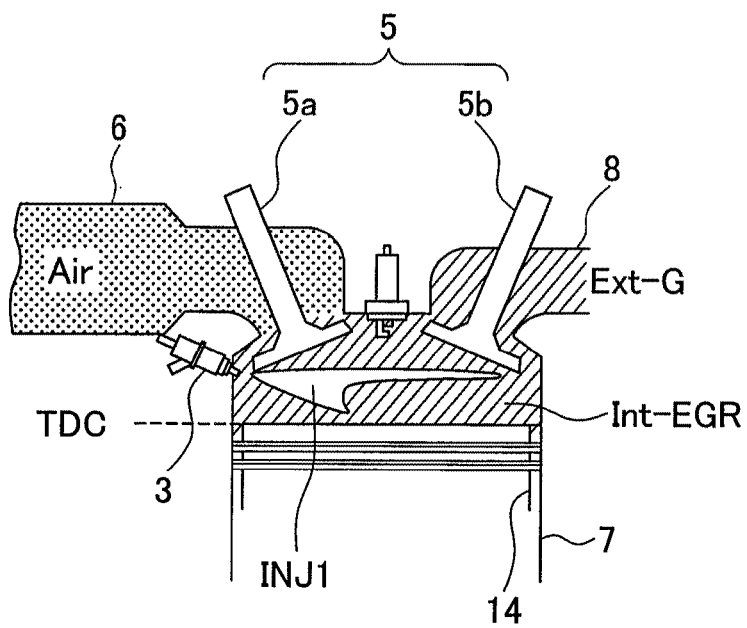
FIG. 7 is a diagram illustrating a state of a combustion chamber at the time of first injection corresponding to the high-load operation area, the first injection being controlled by the control apparatus for the spark-ignition engine according to the first embodiment of the present invention.

FIG. 7 is a diagram illustrating a state of the combustion chamber at the time of the first injection corresponding to the high-load operation area, the first injection being controlled by the control apparatus for the spark-ignition engine according to the first embodiment of the present invention. Incidentally, reference numerals which are the same as those shown in FIG. 1 denote identical components.

Because fuel is injected at a point of time close to a top dead center TDC, a large part of gas existing in the combustion chamber is internal EGR (Int-EGR) whose temperature is high. Therefore, a cooling effect of the first injection INJ1 carried out from the injector 3 can be applied to only the internal EGR.

Here, in order to efficiently cool only the internal EGR, it is necessary to carry out such control that the start time of the first injection falls within a range from 15° before a top dead center to 15° after the top dead center. The valve overlap period V-ovlp shown in FIG. 6A corresponds to the range from 15° before the top dead center to 15° after the top dead center. The start time of the first injection is included in the valve overlap period V-ovlp. As shown in FIG. 6C, the start time of the first injection is closed to the intake top dead center TDC-i.

Thus, if fuel is injected at the point of time close to the top dead center, the distance between the piston and the injector is short. Therefore, the fuel easily adheres to the piston. For this reason, as shown in FIG. 6C, the first injection quantity (injection pulse width) INJ1 is decreased to a level that is lower than the second injection quantity (injection pulse width) INJ2 so as to control the penetration of fuel spraying. This makes it possible to prevent fuel from adhering to the piston.

As described above, according to this embodiment, fuel is injected at a point of time close to the top dead center at which the exhaust stroke ends in the high-load operation area. As a result, internal EGR is efficiently cooled, and accordingly, the generation of a hot spot in the combustion chamber is suppressed, which makes it possible to reduce knocking. Therefore, it becomes possible to suppress the reduction in thermal efficiency and the reduction in torque, which are caused by the ignition retard control.

In addition, a residual-gas suction unit is also not required.

Moreover, because the start of the second injection INJ2 is set at a point of time that falls within a range from the middle to the end of the intake stroke, a problem of the deterioration of an exhaust gas, which is caused by the increase in soot volume, can also be solved.

Figure 8:
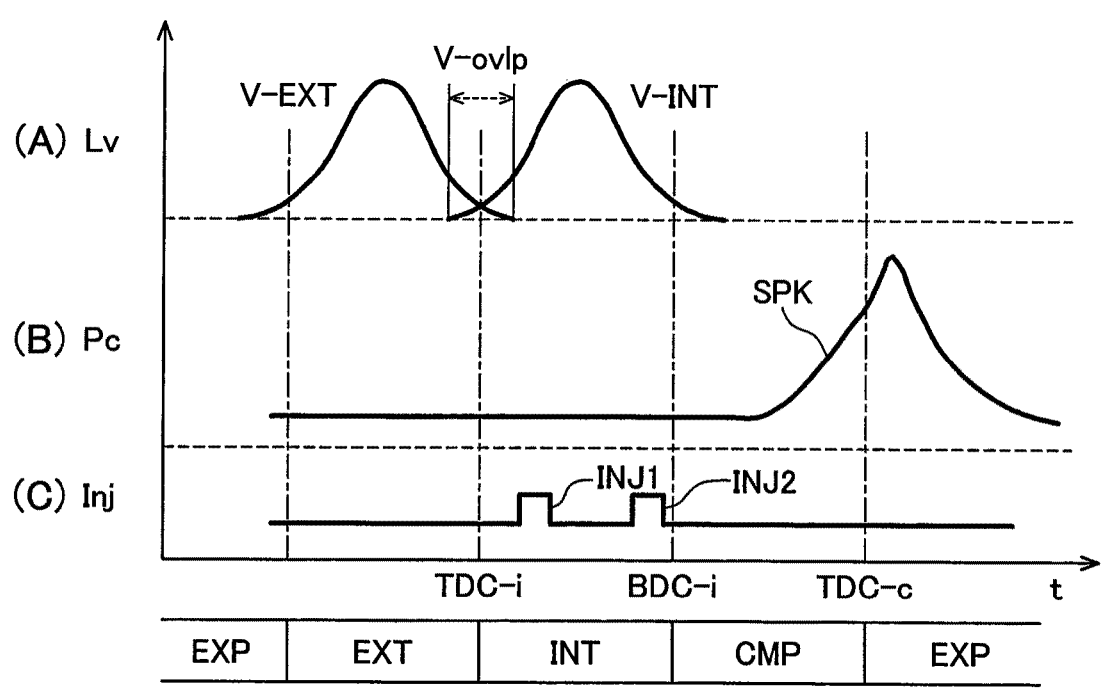
FIGS. 8A through 8C are timing charts each illustrating the fuel injection control for the high-load operation area performed by a control apparatus for a spark-ignition engine according to a second embodiment.
Figure 9:
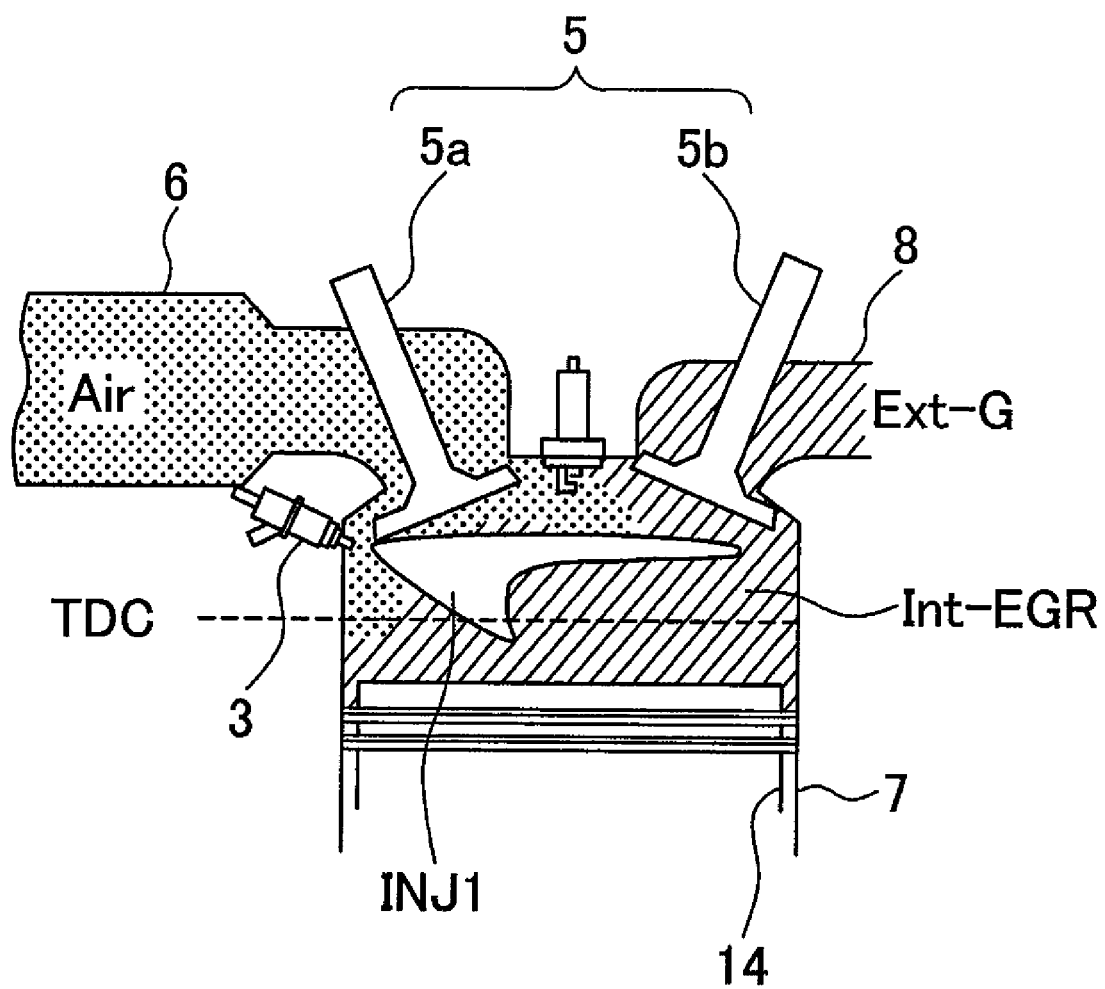
FIG. 9 is a diagram illustrating a state of a combustion chamber at the time of first injection corresponding to the high-load operation area, the first injection being controlled by the control apparatus for the spark-ignition engine according to the second embodiment of the present invention.

Next, the configuration of a control apparatus for a spark-ignition engine according to a second embodiment of the present invention, and the operation thereof, will be described with reference to FIGS. 8, 9. The configuration of a system in which the control apparatus for the spark-ignition engine according to this embodiment is applied to an automobile gasoline engine is similar to that shown in FIG. 1. The control apparatus for the spark-ignition engine according to this embodiment is configured in a manner similar to that shown in FIG. 2. A high-load operation area used by the control apparatus for the spark-ignition engine according to this embodiment is similar to that shown in FIG. 3. Fuel injection control performed by the control apparatus for the spark-ignition engine according to this embodiment is similar to that shown in FIG. 4.

FIGS. 8A through 8C are timing charts each illustrating the fuel injection control for the high-load operation area performed by the control apparatus for the spark-ignition engine according to the second embodiment. FIG. 9 is a diagram illustrating a state of a combustion chamber at the time of first injection corresponding to the high-load operation area, the first injection being controlled by the control apparatus for the spark-ignition engine according to the second embodiment of the present invention. Incidentally, in FIG. 9, reference numerals which are the same as those shown in FIG. 1 denote identical components.

A point of difference between the first and second embodiments is how fuel injection is controlled in the high-load operation area.

In FIGS. 8A through 8C, a horizontal axis indicates the time t. A vertical axis of FIG. 8A indicates the valve lift amount Lv. Incidentally, in FIG. 8A, a solid line V-EXT indicates the lift amount of an exhaust valve, whereas a solid line V-INT indicates the lift amount of an intake valve. In addition, a period of time during which both the exhaust valve and the intake valve open is a valve overlap period V-ovlp. A vertical axis of FIG. 8B indicates the cylinder inner pressure Pc. A vertical axis of FIG. 8C indicates a fuel injection signal Inj.

As indicated with the solid line V-EXT in FIG. 8A, the exhaust valve starts opening at the end of an expansion stroke (EXP), and closes at the start of an intake stroke (INT). In contrast, as indicated with the solid line V-INT in FIG. 8A, the intake valve starts opening at the end of an exhaust stroke (EXT), and closes at the start of a compression stroke (CMP). Therefore, a valve overlap period V-ovlp during which both the exhaust valve and the intake valve open exists.

A solid line of FIG. 8B indicates a change in cylinder inner pressure Pc.

As shown in FIG. 8C, the ECU 20 performs the high-load fuel injection control B in the high-load operation area. To be more specific, fuel is injected in two parts (in other words, fuel injection is partially performed twice). The start of the first injection INJ1 is set at a point of time immediately after the exhaust valve closes. As is the case with the first embodiment, the start of the second injection INJ2 is set at a point of time that ranges from the middle to the end of the intake stroke. In addition, the timing of ignition SPK is set at the end of a compression stroke.

As is the case with the first embodiment, the first injection INJ1 performs injection toward internal EGR. As a result, the generation of a hot spot in the combustion chamber can be suppressed. The second injection INJ2 cools a mixture gas of air and the internal EGR to decrease the average temperature in the combustion chamber. In addition, by finishing the injection of the whole amount of required fuel until the intake valve closes, the sufficient charging efficiency (torque) is ensured, and the length of time required to mix the fuel and air is also ensured. As a result, the homogenization of the mixture gas is achieved, which prevents the exhaustion from becoming worse.

Next, a state of the combustion chamber at the time of the first injection corresponding to the high-load operation area according to this embodiment will be described with reference to FIG. 9. According to this embodiment, because the first fuel injection INJ1 is started after the exhaust valve closes, it is possible to prevent fuel from being directly exhausted into the exhaust pipe 8 through the exhaust valve 5b. Moreover, because the fuel injection is started with a piston kept at a position lower than the top dead center, the injected fuel hardly adheres to the piston, which makes it possible to increase the injection quantity of the first injection. Therefore, a larger internal-EGR cooling effect can be achieved.

According to this embodiment, by starting the fuel injection immediately after the exhaust valve closes in the high-load operation area so that internal EGR is efficiently cooled, the generation of a hot spot in the combustion chamber can be suppressed, and accordingly, knocking can be reduced. At the same time, it is possible to prevent fuel from being exhausted into the exhaust pipe, and thereby to prevent the exhaustion and fuel consumption from becoming worse.

Further, a larger internal-EGR cooling effect can be achieved by increasing the injection quantity of the first injection.

In addition, a residual-gas suction unit is also not required.

Moreover, because the start of the second injection INJ2 is set at a point of time that falls within a range from the middle to the end of the intake stroke, a problem of the deterioration of an exhaust gas, which is caused by the increase in soot volume, can also be solved.

Next, the configuration of a control apparatus for a spark-ignition engine according to a third embodiment of the present invention, and the operation thereof, will be described with reference to FIGS. 10 through 12. The configuration of a system in which the control apparatus for the spark-ignition engine according to this embodiment is applied to an automobile gasoline engine is similar to that shown in FIG. 1. The control apparatus for the spark-ignition engine according to this embodiment is configured in a manner similar to that shown in FIG. 2. A high-load operation area used by the control apparatus for the spark-ignition engine according to this embodiment is similar to that shown in FIG. 3.

FIG. 10 is a flowchart illustrating how the fuel injection is controlled by the control apparatus for the spark-ignition engine according to the third embodiment of the present invention. FIGS. 11A through 11C are timing charts each illustrating the fuel injection control for the high-load operation area performed by the control apparatus for the spark-ignition engine according to the third embodiment. FIG. 12 is a diagram illustrating a state of a combustion chamber at the time of first injection corresponding to the high-load operation area, the first injection being controlled by the control apparatus for the spark-ignition engine according to the third embodiment of the present invention. Incidentally, in FIG. 12, reference numerals which are the same as those shown in FIG. 1 denote identical components.

In this embodiment, points of difference between the first and second embodiments are the fuel injection control in the high-load operation area, and the variable valve control.

First, the fuel injection control and the variable valve control according to this embodiment will be described with reference to FIG. 10. The ECU 20 repeats the fuel injection control shown in FIG. 10 in specified cycles.

In a step S110, the ECU 20 reads out information about current engine operation conditions (the engine speed, the engine torque, and the like).

Next, in a step S120, the ECU 20 makes a judgment from a map stored beforehand, or the like, as to whether or not the current operation conditions correspond to the high-load operation area. If the current operation conditions do not correspond to the high-load operation area, the ECU 20 judges that the current operation conditions correspond to the normal operation area. Accordingly, in a step S130, the ECU 20 performs the normal fuel injection control. Then, in a step S150, the ECU 20 performs normal valve control.

In contrast to this, if it is judged in the step S120 that the current operation conditions correspond to the high-load operation area, the ECU 20 performs high-load fuel injection control C in a step S140C. Then, in a step S160, the ECU 20 performs high-load valve control.

Next, in FIGS. 11A through 11C, a horizontal axis indicates the time t. A vertical axis of FIG. 11A indicates the valve lift amount Lv. Incidentally, in FIG. 11A, a solid line V-EXT indicates the lift amount of an exhaust valve, whereas a solid line V-INT indicates the lift amount of an intake valve. In addition, a period of time during which both the exhaust valve and the intake valve close is a negative valve overlap period V-mi-ovlp. A vertical axis of FIG. 11B indicates the cylinder inner pressure Pc. A vertical axis of FIG. 11C indicates a fuel injection signal Inj.

The ECU 20 performs the high-load valve control in the high-load operation area. To be more specific, as indicated with a solid line V-INT in FIG. 11A, the timing at which the intake valve opens is retarded (retarded angle); and a variable valve is so controlled that a negative valve overlap period V-mi-ovlp during which both the intake valve and the exhaust valve close is provided. At this time, as indicated with a solid line V-EXT in FIG. 11A, the timing at which the exhaust valve closes is set at a point of time close to an intake top dead center TDC-i so that internal EGR is left in the combustion chamber as little as possible.

A solid line of FIG. 11B indicates a change in cylinder inner pressure Pc.

As shown in FIG. 11C, the ECU 20 performs the high-load fuel injection control C in the high-load operation area. To be more specific, fuel is injected in several parts (in other words, fuel injection is partially performed a plurality of times). In addition, the start of the first injection INJ1 is set at a point of time corresponding to the negative valve overlap period V-mi-ovlp. As is the case with the first and second embodiments, the start of the second injection INJ2 is set at a point of time that ranges from the middle to the end of an intake stroke.

As is the case with the first and second embodiments, the first injection INJ1 performs injection toward internal EGR. As a result, the generation of a hot spot in the combustion chamber can be suppressed. The second injection INJ2 cools a mixture gas of air and the internal EGR to decrease the average temperature in the combustion chamber. In addition, by finishing the injection of the whole amount of required fuel until the intake valve closes, the sufficient charging efficiency (torque) is ensured, and the length of time required to mix the fuel and air is also ensured. As a result, the homogenization of the mixture gas is achieved, which prevents the exhaustion from becoming worse.

Next, a state of the combustion chamber at the time of the first injection corresponding to the high-load operation area according to this embodiment will be described with reference to FIG. 12. According to this embodiment, the closing timing of the exhaust valve is set at a point of time close to the intake top dead center TDC-i; and the opening timing of the intake valve is more retarded (retarded angle) than the intake top dead center. As a result, the negative valve overlap period V-mi-ovlp is provided after the top dead center. By setting the valve timing in this manner, a state in which only internal EGR exists in the combustion chamber, even after the top dead center, with the internal EGR left as little as possible can be kept for a long period of time. With this state kept, the first injection INJ1 is started during the negative valve overlap period. This enables injection completely toward only internal EGR. As a result, an evaporative cooling effect of fuel can be totally applied to the internal EGR.

In addition, because the fuel injection is started after the exhaust valve closes, it is possible to prevent fuel from being directly exhausted into the exhaust pipe through the exhaust valve. Moreover, because the fuel injection is started with a piston kept at a position lower than the top dead center, the injected fuel hardly adheres to the piston, which makes it possible to increase the injection quantity of the first injection. Therefore, a larger internal-EGR cooling effect can be achieved.

Moreover, when the opening of the intake valve is retarded, the combustion chamber is subjected to the negative pressure in the beginning of an intake stroke. Accordingly, the flow speed of air taken from the intake pipe into the combustion chamber increases immediately after the intake valve opens. This phenomenon generates strong flow (disturbance) in the combustion chamber, which causes the internal EGR to further mix with air. As a result, the generation of a hot spot can be suppressed.

According to this embodiment, a negative valve overlap period is provided at or after a top dead center in the high-load operation area, and the first injection is started during the negative valve overlap period. Therefore, injection completely toward only internal EGR becomes possible. Accordingly, an evaporative cooling effect of fuel can be totally applied to the internal EGR. As a result, the generation of a hot spot in the combustion chamber can be suppressed, and accordingly, knocking can be reduced. And at the same time, it is possible to prevent fuel from being exhausted into the exhaust pipe, and thereby to prevent the exhaustion and fuel consumption from becoming worse.

In addition, because the injection quantity of the first injection can be increased, a larger internal-EGR cooling effect can be achieved.

Moreover, the generation of a hot spot can be suppressed by retarding the opening of the intake valve.

Further, a residual-gas suction unit is also not required.

Furthermore, because the start of the second injection INJ2 is set at a point of time that falls within a range from the middle to the end of the intake stroke, a problem of the deterioration of an exhaust gas, which is caused by the increase in soot volume, can also be solved.

Next, the configuration of a control apparatus for a spark-ignition engine according to a fourth embodiment of the present invention, and the operation thereof, will be described with reference to FIGS. 13, 14. The configuration of a system in which the control apparatus for the spark-ignition engine according to this embodiment is applied to an automobile gasoline engine is similar to that shown in FIG. 1. The control apparatus for the spark-ignition engine according to this embodiment is configured in a manner similar to that shown in FIG. 2. A high-load operation area used by the control apparatus for the spark-ignition engine according to this embodiment is similar to that shown in FIG. 3.

Figure 13:
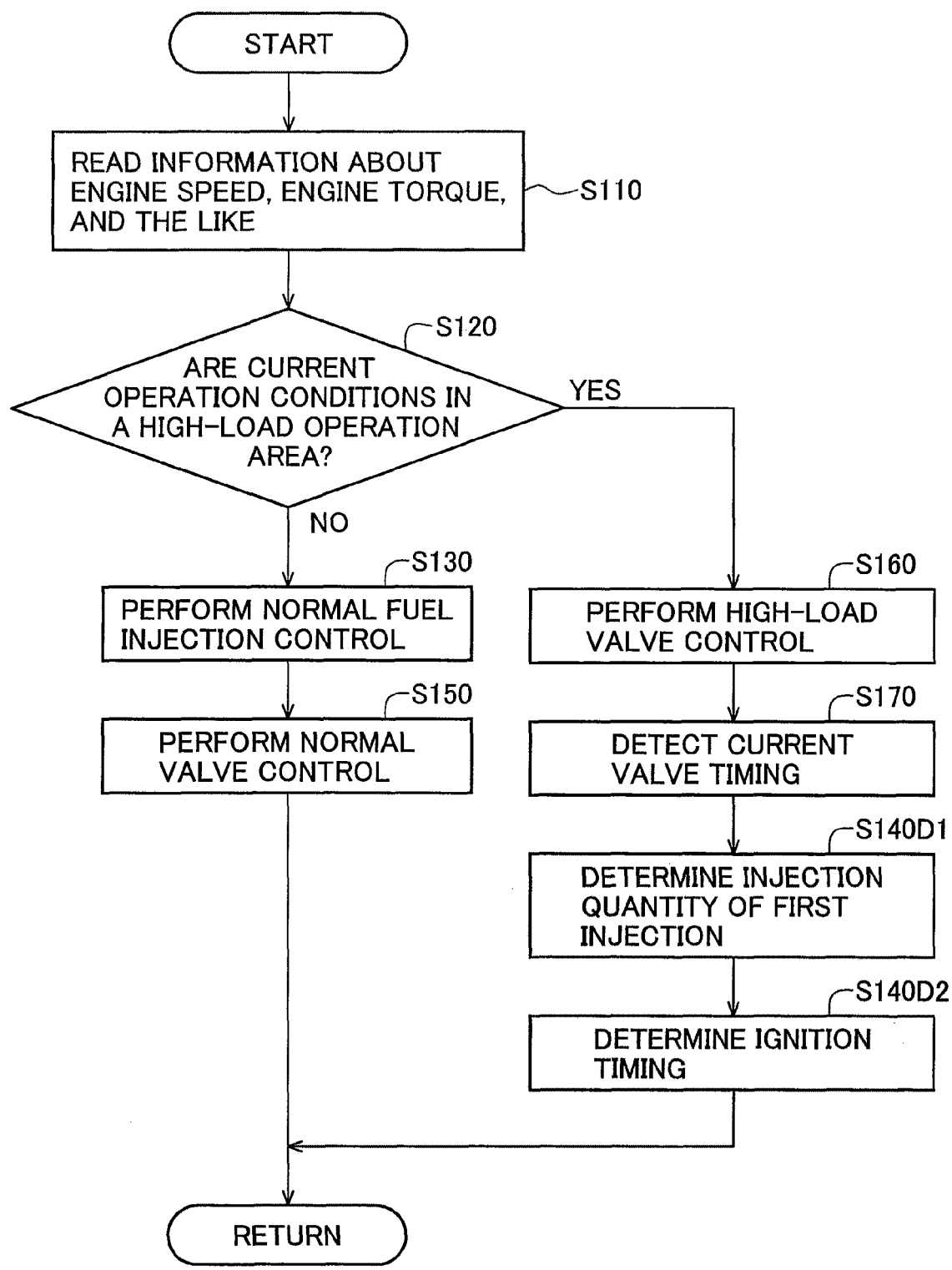
FIG. 13 is a flowchart illustrating how fuel injection is controlled by a control apparatus for a spark-ignition engine according to a fourth embodiment of the present invention.
Figure 14:
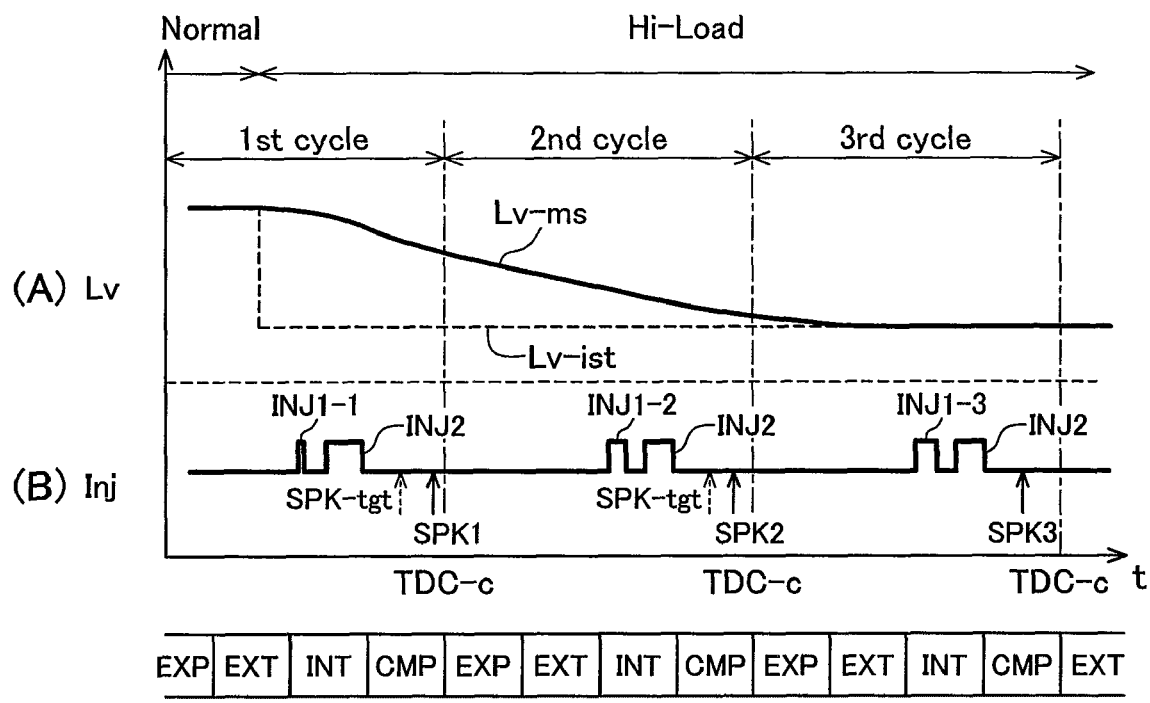
FIGS. 14A and 14B are timing charts each illustrating the fuel injection control for the high-load operation area performed by the control apparatus for the spark-ignition engine according to the fourth embodiment.

FIG. 13 is a flowchart illustrating how the fuel injection is controlled by the control apparatus for the spark-ignition engine according to the fourth embodiment of the present invention. FIGS. 14A and 14B are timing charts each illustrating the fuel injection control for the high-load operation area performed by the control apparatus for the spark-ignition engine according to the fourth embodiment.

Figure 11:
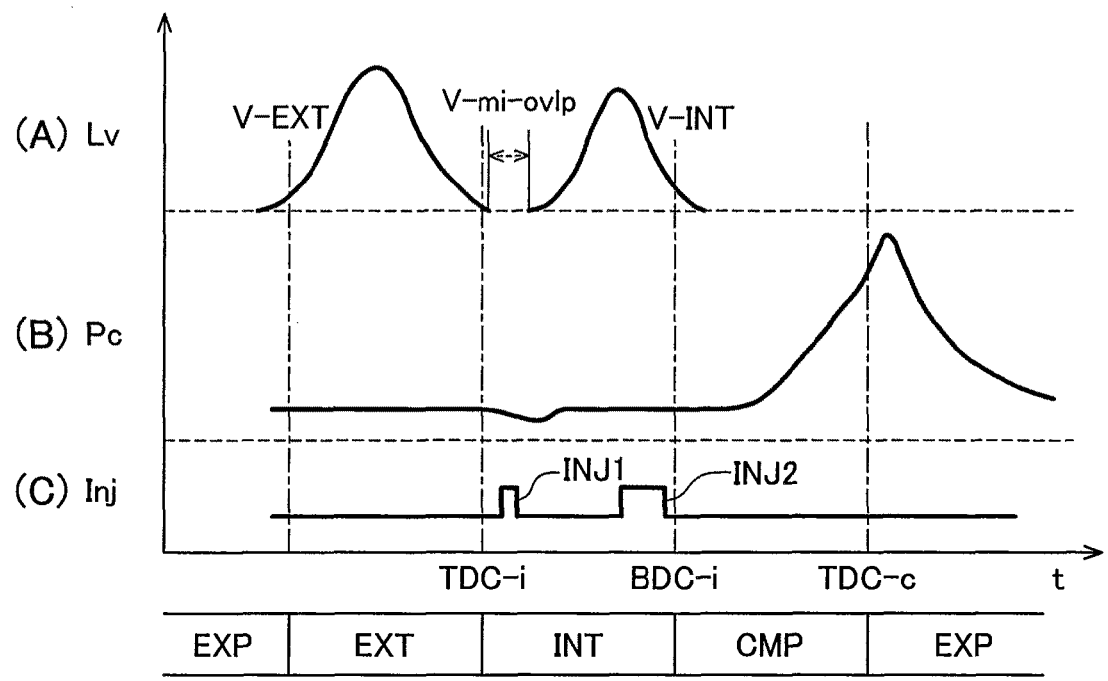
FIGS. 11A through 11C are timing charts each illustrating the fuel injection control for the high-load operation area performed by the control apparatus for the spark-ignition engine according to the third embodiment.
Figure 12:
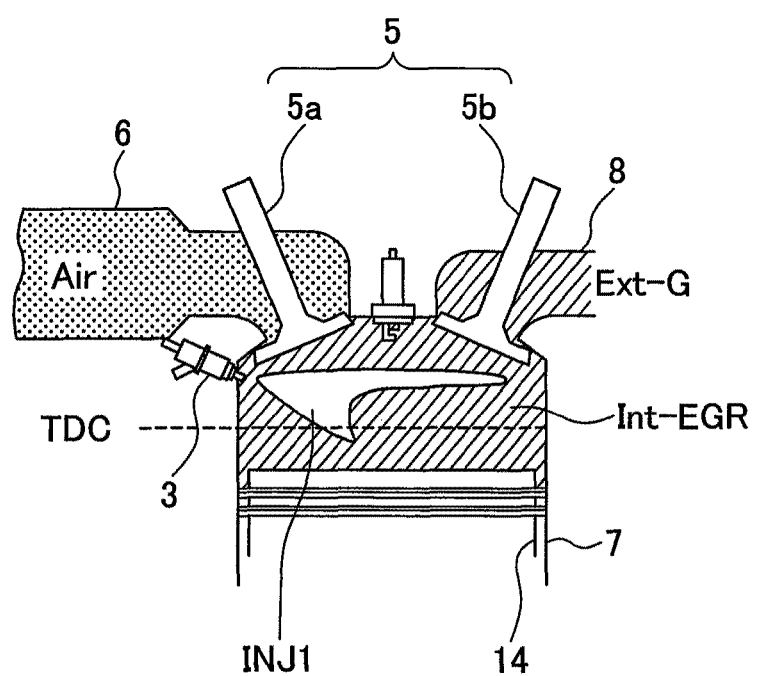
FIG. 12 is a diagram illustrating a state of a combustion chamber at the time of first injection corresponding to the high-load operation area, the first injection being controlled by the control apparatus for the spark-ignition engine according to the third embodiment of the present invention.

The third embodiment described with reference to FIGS. 10 through 12 is based on the assumption that for the fuel injection control (the first injection quantity control) whose settings can be switched on a cycle basis, a high-response variable valve mechanism whose settings can be switched on a cycle basis in like manner is used. Therefore, a target value of the fuel injection quantity and that of the valve timing can be concurrently switched.

In contrast to this, this embodiment is based on the assumption that an engine is equipped with such a variable valve mechanism that when a target value is changed, a period of time equivalent to at least several cycles is required until the target value is reached. In this case, if a target value of the fuel injection quantity and that of the valve timing are concurrently switched, the valve timing delays with respect to the fuel injection quantity. This causes problems (for example, fuel adhesion to the piston) during the period of time until the valve timing reaches the target value.

Because of it, a point of difference between the third and fourth embodiments is a fuel injection control method in the high-load operation area. To be more specific, when a target value is changed due to a change in operation conditions, the first injection quantity is gradually increased in response to the response speed of the valve timing (for example, the timing at which the exhaust valve is closed). In addition to it, in order to reduce transient knocking during a period of time until the valve timing reaches the target value, the ignition timing is temporarily more retarded than a target value corresponding to current operation conditions.

First, the fuel injection control and the variable valve control according to this embodiment will be described with reference to FIG. 13. The ECU 20 repeats the fuel injection control shown in FIG. 13 in specified cycles.

In a step S110, the ECU 20 reads out information about current engine operation conditions (the engine speed, the engine torque, and the like).

Next, in a step S120, the ECU 20 makes a judgment from a map stored beforehand, or the like, as to whether or not the current operation conditions correspond to the high-load operation area. If the current operation conditions do not correspond to the high-load operation area, the ECU 20 judges that the current operation conditions correspond to the normal operation area. Accordingly, in a step S130, the ECU 20 performs the normal fuel injection control. Then, in a step S150, the ECU 20 performs normal valve control.

In contrast to this, if it is judged in the step S120 that the current operation conditions correspond to the high-load operation area, the ECU 20 performs high-load valve control in a step S160.

Next, in a step S170, the ECU 20 detects the current valve timing.

Next, in a step S140D1, the ECU 20 determines the injection quantity of the first injection on the basis of the current valve timing detected in the step S170. Moreover, in a step S140D2, on the basis of the current valve timing, the ECU 20 determines the ignition retard amount corresponding to an ignition-timing setting value under current operation conditions.

Next, in FIGS. 14A and 14B, a horizontal axis indicates the time t. A vertical axis of FIG. 14A indicates the valve lift amount Lv. Here, FIG. 14A takes as an example the timing at which the exhaust valve closes. In FIG. 14A, a broken line indicates an instruction value Lv-ist of the valve lift amount of the exhaust valve, whereas a solid line indicates an actually measured value Lv-ms of the valve lift amount of the exhaust valve. As indicated with the broken line in FIG. 14A, even if the instruction value Lv-ist of the valve lift amount of the exhaust valve is output to the variable valve mechanism as an instruction, a delay in the valve timing of the variable valve mechanism causes the actual valve lift amount to change in a manner similar to that of the actually measured value Lv-ms of the valve lift amount indicated with the solid line. In the step S170 shown in FIG. 13, the actually measured value Lv-ms of the valve lift amount is detected as the valve timing.

In addition, a vertical axis of FIG. 14B indicates a fuel injection signal Inj.

As shown in FIG. 14B, the ECU 20 performs the high-load fuel injection control D and the ignition timing control in the high-load operation area. To be more specific, as is the case with FIG. 11C, fuel is injected in several parts (in other words, fuel injection is partially performed a plurality of times). In addition, the start of the first injection INJ1 is set at a point of time corresponding to the negative valve overlap period V-mi-ovlp; and the start of the second injection INJ2 is set at a point of time that ranges from the middle to the end of an intake stroke.

Here, on the assumption that one cycle is constituted of an expansion stroke—an exhaust stroke—an intake stroke—a compression stroke, a point of time at which a normal operation area Normal switches to a high-load operation area H-Load corresponds to a first cycle. If the first cycle is successively followed by a second cycle, and a third cycle, the injection quantity of the first injection in the second cycle INJ1-2 (the pulse width of the first injection INJ1-2 shown in FIG. 14B) is increased to a value that is larger than the injection quantity of the first injection in the first cycle INJ1-1 (the pulse width of the first injection INJ1-1 shown in FIG. 14B). Further, the injection quantity of the first injection in the third cycle INJ1-3 (the pulse width of the first injection INJ1-3 shown in FIG. 14B) is increased to a value that is larger than the injection quantity of the first injection in the second cycle INJ1-2 (the pulse width of the first injection INJ1-2 shown in FIG. 14B). Thus, the injection quantity of the first injection INJ1 is gradually increased in response to a delay in response to the valve lift amount.

In addition, the ignition timing in the first cycle SPK-1 is set at the end of the compression stroke. This is the timing that is more retarded than a target value SPK-tgt under current operation conditions. Then, the ignition timing in the second cycle SPK-2 is slightly advanced (shifted to the advanced angle side) with respect to the ignition timing in the first cycle SPK-1 so that the ignition timing in the second cycle SPK-2 nears the target value SPK-tgt under the current operation conditions. Further, the ignition timing in the third cycle SPK-3 is retarded with respect to the ignition timing in the second cycle SPK-2. In the figure, the ignition timing in the third cycle SPK-3 coincides with the target value SPK-tgt under the current operation conditions.

Also in this embodiment, the first injection INJ1 is injection toward internal EGR. As a result, the generation of a hot spot in the combustion chamber can be suppressed. The second injection INJ2 cools a mixture gas of air and the internal EGR to decrease the average temperature in the combustion chamber.

The first injection quantity is gradually increased in response to the response speed of the valve timing. In addition to it, in order to reduce transient knocking during a period of time until the valve timing reaches the target value, the ignition timing is temporarily more retarded than a target value corresponding to current operation conditions.

According to this embodiment, the first injection toward internal EGR in the high-load area makes it possible to totally apply an evaporative cooling effect of fuel to the internal EGR. As a result, the generation of a hot spot in the combustion chamber can be suppressed, and accordingly, knocking can be reduced. And at the same time, it is possible to prevent fuel from being exhausted into the exhaust pipe, and thereby to prevent the exhaustion and fuel consumption from becoming worse.

In addition, when operation conditions change in the high-load area, the fuel injection control and the ignition retard control are performed in consideration of the responsiveness of the variable valve mechanism. This makes it possible to reduce transient knocking, and to prevent the exhaustion from becoming worse, during a period of time until the valve timing reaches the target value.

Moreover, a residual-gas suction unit is also not required.

Furthermore, because the start of the second injection INJ2 is set at a point of time that falls within a range from the middle to the end of the intake stroke, a problem of the deterioration of an exhaust gas, which is caused by the increase in soot volume, can also be solved.

Next, the configuration of a control apparatus for a spark-ignition engine according to a fifth embodiment of the present invention, and the operation thereof, will be described with reference to FIGS. 15 through 18. The control apparatus for the spark-ignition engine according to this embodiment is configured in a manner similar to that shown in FIG. 2. A high-load operation area used by the control apparatus for the spark-ignition engine according to this embodiment is similar to that shown in FIG. 3.

First, the configuration of a system in which the control apparatus for the spark-ignition engine according to this embodiment is applied to an automobile gasoline engine will be described with reference to FIG. 15.

Figure 15:
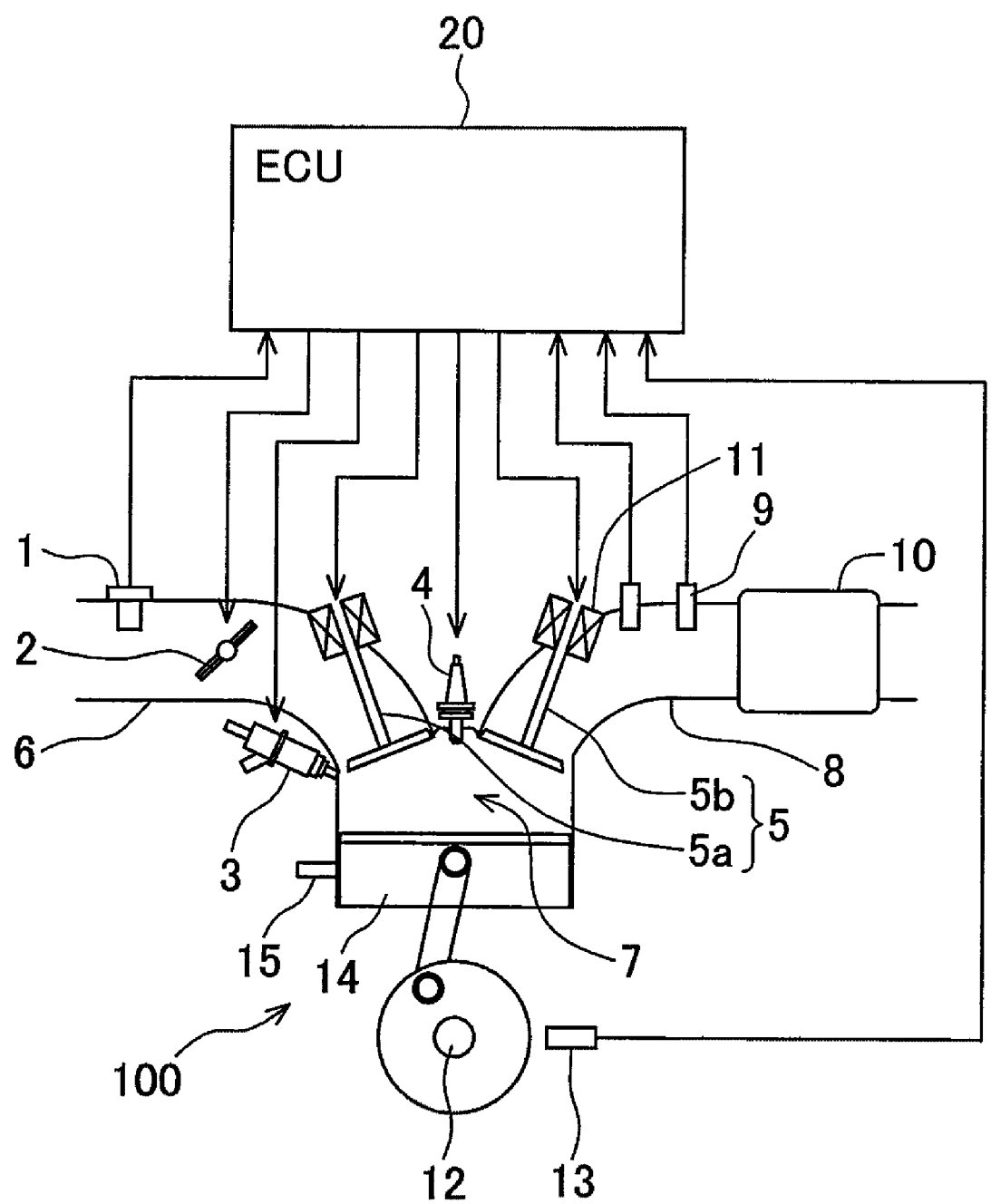
FIG. 15 is a diagram illustrating the configuration of a system in which a control apparatus for a spark-ignition engine according to a fifth embodiment of the present invention is applied to an automobile gasoline engine.

FIG. 15 is a diagram illustrating the configuration of the system in which the control apparatus for the spark-ignition engine according to the fifth embodiment of the present invention is applied to the automobile gasoline engine. Incidentally, reference numerals which are the same as those shown in FIG. 1 denote identical components.

According to this embodiment, the system of the internal combustion engine shown in FIG. 1 is configured to further include a knock sensor 15. The knock sensor 15 is disposed at a proper position of the cylinder 7. The knock sensor 15 measures a vibrational state of the engine 100. On the basis of this output signal, the ECU 20 judges whether or not knocking has occurred in the engine 100.

Figure 17:
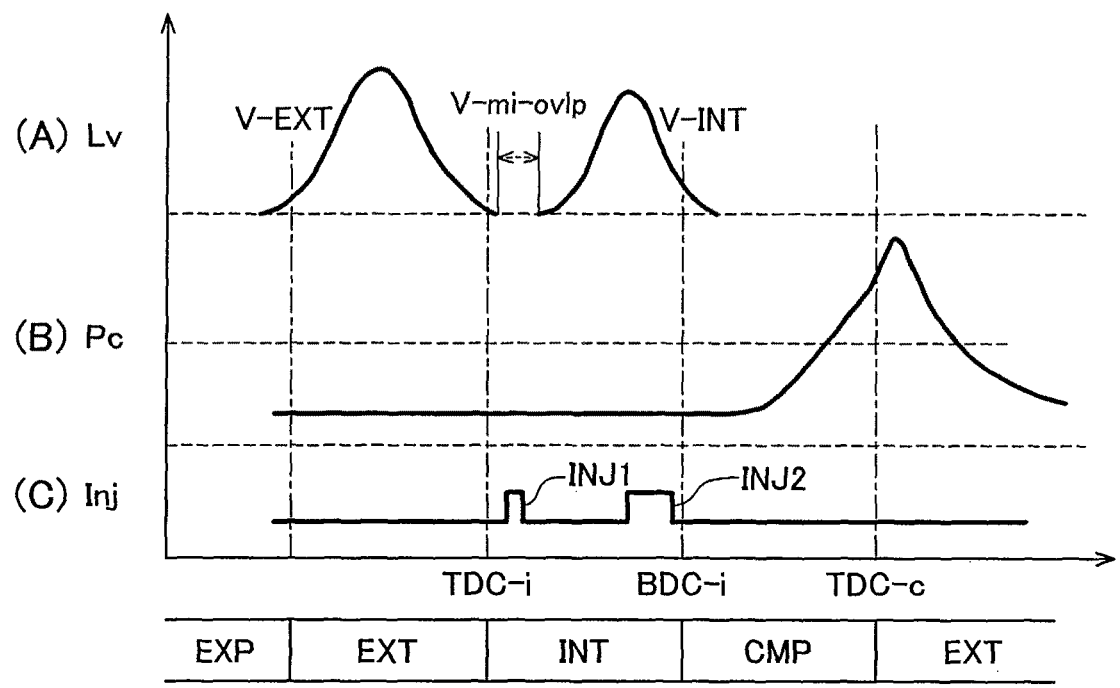
FIGS. 17A through 17C are timing charts each illustrating the fuel injection control for the normal operation area performed by the control apparatus for the spark-ignition engine according to the fifth embodiment.
Figure 18:
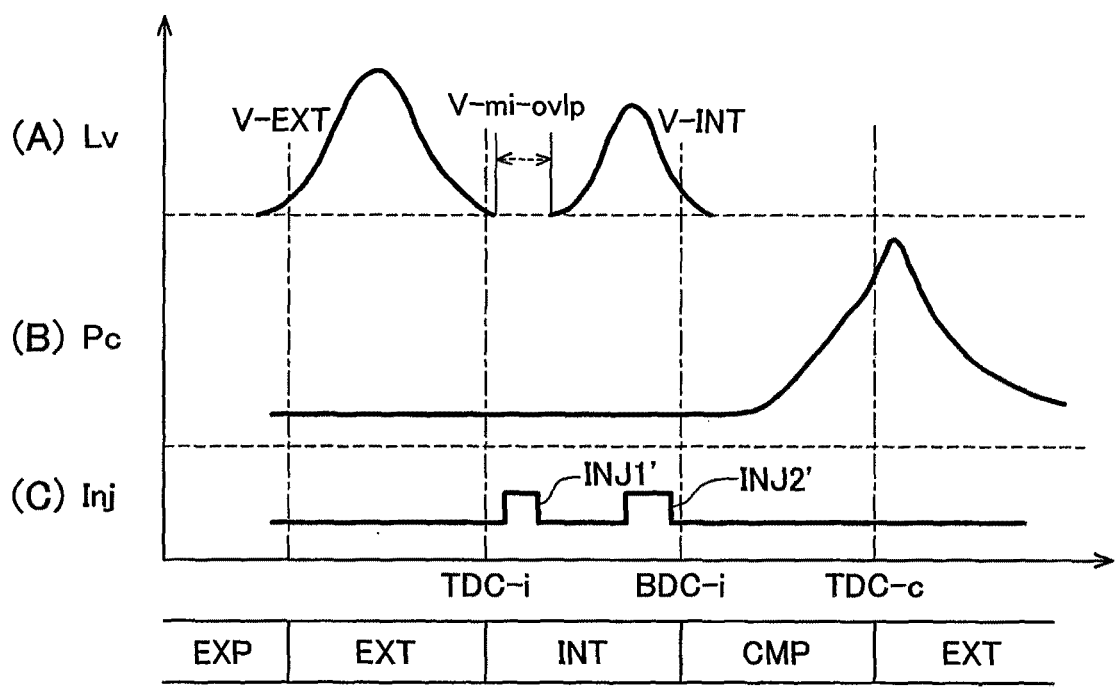
FIGS. 18A through 18C are timing charts each illustrating the fuel injection control for the high-load operation area performed by the control apparatus for the spark-ignition engine according to the fifth embodiment.

Next, the fuel injection control performed by the control apparatus for the spark-ignition engine according to this embodiment will be described with reference to FIGS. 16 through 18.

Figure 16:
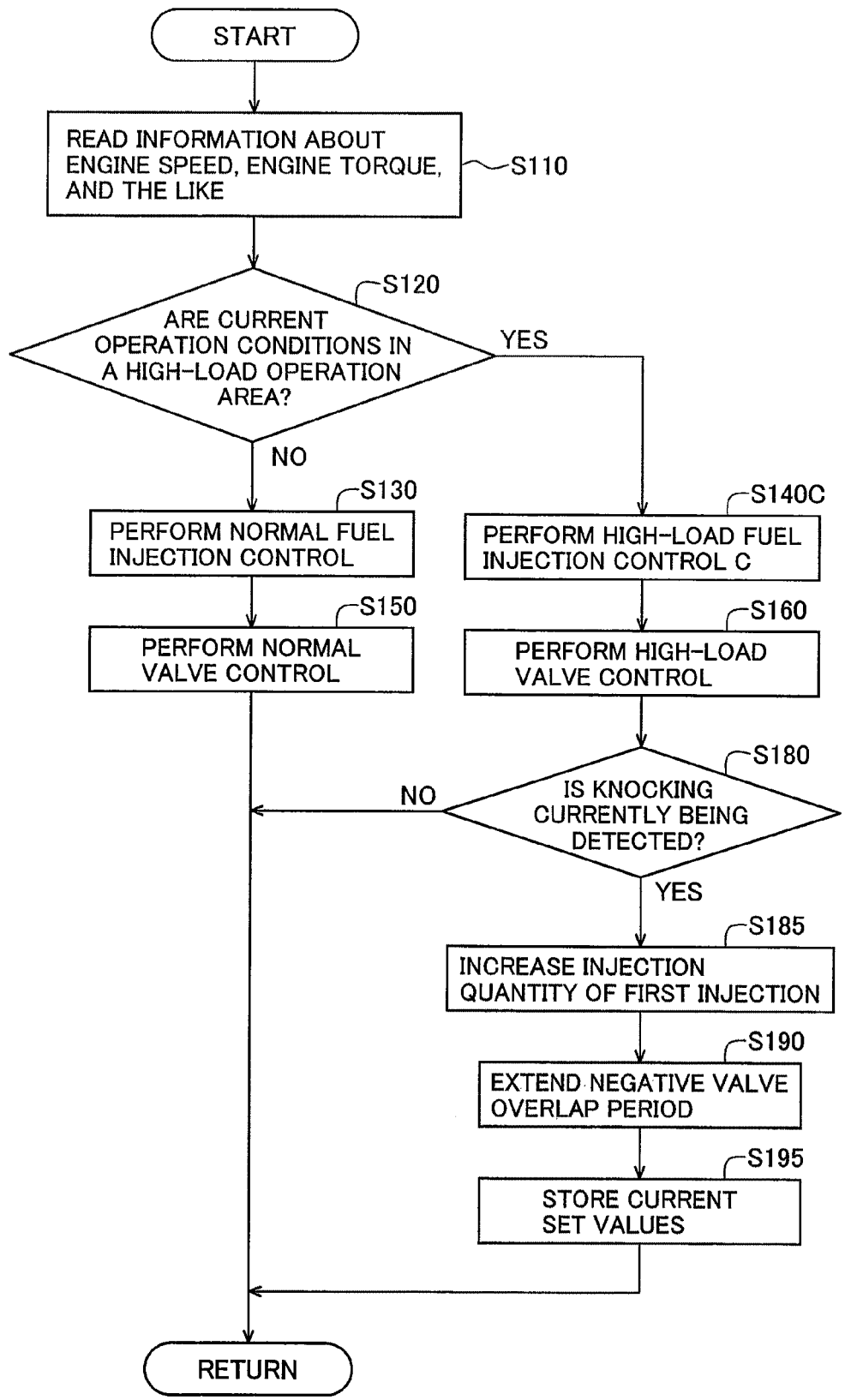
FIG. 16 is a flowchart illustrating how fuel injection is controlled by the control apparatus for the spark-ignition engine according to the fifth embodiment of the present invention.

FIG. 16 is a flowchart illustrating how the fuel injection is controlled by the control apparatus for the spark-ignition engine according to the fifth embodiment of the present invention. FIGS. 17A through 17C are timing charts each illustrating the fuel injection control for the normal operation area performed by the control apparatus for the spark-ignition engine according to the fifth embodiment. FIGS. 18A through 18C are timing charts each illustrating the fuel injection control for the high-load operation area performed by the control apparatus for the spark-ignition engine according to the fifth embodiment.

First, the fuel injection control and the variable valve control according to this embodiment will be described with reference to FIG. 16. The ECU 20 repeats the fuel injection control shown in FIG. 16 in specified cycles.

In a step S110, the ECU 20 reads out information about current engine operation conditions (the engine speed, the engine torque, and the like).

Next, in a step S120, the ECU 20 makes a judgment from a map stored beforehand, or the like, as to whether or not the current operation conditions correspond to the high-load operation area. If the current operation conditions do not correspond to the high-load operation area, the ECU 20 judges that the current operation conditions correspond to the normal operation area. Accordingly, in a step S130, the ECU 20 performs the normal fuel injection control. Then, in a step S150, the ECU 20 performs the normal valve control.

In contrast to this, if it is judged in the step S120 that the current operation conditions correspond to the high-load operation area, the ECU 20 performs the high-load fuel injection control C in a step S140C as described in FIGS. 10 and 11. Then, in a step S160, the ECU 20 performs the high-load valve control.

Next, in a step S180, the ECU 20 judges whether or not knocking is currently being detected. If it is judged that knocking is currently being detected, the ECU 20 increases the injection quantity of the first injection in a step S185. After that, in a step S190, the ECU 20 extends the negative valve overlap period. Then, in a step S195, the ECU 20 stores a set value of the current injection quantity and that of the valve timing.

FIGS. 17A through 17B are timing charts each illustrating the fuel injection control for the high-load operation area when knocking is not occurring. In this case, the fuel injection and the valves are set in the same manner as those of the third embodiment. FIGS. 18A through 18B are timing charts each illustrating the fuel injection control for the high-load operation area when knocking has occurred.

In FIGS. 17A through 17C and 18A through 18C, a horizontal axis indicates the time t. Vertical axes of FIGS. 17A and 18A indicate the valve lift amount Lv. Incidentally, in FIGS. 17A and 18A, a solid line V-EXT indicates the lift amount of the exhaust valve, whereas a solid line V-INT indicates the lift amount of the intake valve. In addition, a period of time during which both the exhaust valve and the intake valve close is a negative valve overlap period V-mi-ovlp. A vertical axis of FIGS. 17B and 18B indicate the cylinder inner pressure Pc. Vertical axes of FIGS. 17C and 18C indicate a fuel injection signal Inj.

Because FIGS. 17A through 17C illustrate the fuel injection control performed in a case where knocking is not occurring, the fuel injection and the valves are set for the high-load operation area in the same manner as those of the third embodiment.

In contrast, FIGS. 18A through 18C illustrate the fuel injection control performed in a case where knocking has occurred. Therefore, when knocking occurs, the injection quantity of the first injection INJ1' is increased as shown in FIG. 18C. In this case, the injection quantity of the second injection INJ2' is decreased by the increased injection quantity of the first injection. Moreover, with the increase in injection quantity of the first injection, the timing at which the intake valve V-INT opens is further delayed as shown in FIG. 18A so that the negative valve overlap period V-mi-ovlp is extended.

As a result, even if the antiknock property of the engine 100 changes due to the aged deterioration and environmental changes of the engine 100, the injection quantity of the first injection and the negative valve overlap period can be properly controlled so that internal EGR is cooled with fuel adhesion to a wall surface suppressed. This makes it possible to keep the high antiknock property.

Incidentally, in the above-description, the first fuel injection quantity and the negative valve overlap period are changed on the basis of the result of the detection by the knock sensor 15 for detecting vibrations of the engine. However, the first fuel injection quantity and the negative valve overlap period may also be changed on the basis of the result of the knocking detection using a signal of a pipe internal pressure sensor or the result of knocking premonitory sign detection.

In addition, when knocking is detected, knocking is avoided only by changing the first fuel injection quantity and the negative valve overlap period. However, the injection control and the valve control may also be performed in combination with knocking avoidance control that uses normal ignition retard.

Moreover, the engine system is assumed to be equipped with a high response variable valve mechanism whose settings can be changed on a cycle basis. However, as described in the fourth embodiment, if an engine is equipped with a variable valve mechanism in which a period of time equivalent to at least several cycles is required until a target value is reached, for example, the valve control is performed in advance, and the injection quantity of the first injection is then determined on the basis of the detected length of a current negative valve overlap period. Furthermore, during a period of time until the length of a negative valve overlap period reaches a target value, the ignition timing may also be subjected to the retard control so that transient knocking is reduced.

As described above, according to this embodiment, when knocking is detected, the injection quantity of the first injection is increased, and the negative valve overlap period is then extended in response to the increase in injection quantity. As a result, even if the antiknock property of the engine changes due to the aged deterioration and environmental changes of the engine, a cooling effect produced by fuel is optimally controlled. This makes it possible to suppress the deterioration of the exhaustion and the decrease in thermal efficiency, and to reduce knocking.

In addition, a residual-gas suction unit is also not required.

Moreover, because the start of the second injection INJ2 is set at a point of time that falls within a range from the middle to the end of the intake stroke, a problem of the deterioration of an exhaust gas, which is caused by the increase in soot volume, can also be solved.

Incidentally, the present invention is not limited to the above-described embodiments, and the design thereof can be changed in various ways within the spirit and scope of the present invention described in claims.

What is claimed is:

1. A control apparatus for the direct injection type spark-ignition engine, the control apparatus comprising:
   control means for performing control so that fuel is injected dividedly at a plurality of times during the high-load operation of the spark-ignition engine, wherein first fuel injection is performed toward gas of internal exhaust gas recirculation which exists in a combustion chamber of the spark-ignition engine,
   wherein said control means performs control so that the first fuel injection starts at a crank angle ranging from −15° to +15° with reference to a top dead center at which an exhaust stroke ends.

2. The control apparatus for the direct injection type spark-ignition engine according to claim 1,
   wherein the spark-ignition engine includes a variable valve actuator which is capable of controlling the opening and closing timing of an intake valve or an exhaust valve,
   wherein said control means controls the variable valve actuator such that a valve overlap period during which both the intake valve and the exhaust valve open is provided during the high-load operation of the spark-ignition engine, and
   wherein said control means performs control such that the first fuel injection is started at a point of time close to a top dead center at which an exhaust stroke ends.

3. The control apparatus for the direct injection type spark-ignition engine according to claim 1,
   wherein the spark-ignition engine includes a variable valve actuator which is capable of controlling the opening and closing timing of an intake valve or an exhaust valve,
   wherein said control means controls the variable valve actuator such that a valve overlap period during which both the intake valve and the exhaust valve open is provided during the high-load operation of the spark-ignition engine, and
   wherein said control means performs control such that the first fuel injection is started after the exhaust valve closes.

4. The control apparatus for the direct injection type spark-ignition engine according to claim 1,
   wherein the spark-ignition engine includes a variable valve actuator which is capable of controlling the opening and closing timing of an intake valve or an exhaust valve,
   wherein said control means controls the variable valve actuator such that a negative valve overlap period during which both the intake valve and the exhaust valve close is provided during the high-load operation of the spark-ignition engine, and
   wherein said control means performs control such that the first fuel injection is started during the negative valve overlap period.

5. The control apparatus for the direct injection type spark-ignition engine according to claim 4,
   wherein said control means controls the variable valve actuator such that the timing at which the intake valve opens is shifted to the retarded angle side with respect to a top dead center to set the negative overlap period on the retarded angle side with respect to the top dead center, and
   wherein said control means performs control such that the first fuel injection is started during the negative overlap period.

6. The control apparatus for the direct injection type spark-ignition engine according to claim 2,
   wherein the spark-ignition engine includes valve timing detection means for detecting a current valve timing, and
   wherein during the high-load operation of the spark-ignition engine, said control means determines the injection quantity of the first fuel injection on the basis of the valve timing detected by the valve timing detection means.

7. The control apparatus for the direct injection type spark-ignition engine according to claim 6,
   wherein during a period of time taken until the current valve timing detected by the valve timing detection means reaches a target value of the valve timing, said control means controls the ignition timing such that the ignition timing is more retarded than a set value of the ignition timing under current operation conditions.

8. The control apparatus for the direct injection type spark-ignition engine according to claim 1,
   wherein the high-load operation is one of the following two situations, one being the case where the opening of a throttle provided to control the amount of intake air of the spark-ignition engine is fully opened, the other being the case where the actual ignition timing is set on the more retarded angle side than the optimum ignition timing at which the highest thermal efficiency is achieved under current operation conditions.

9. The control apparatus for the direct injection type spark-ignition engine according to claim 1,
   wherein the spark-ignition engine includes knocking detection means for detecting knocking, and
   wherein when based on a result obtained from the knocking detection means said control means judges that knocking is occurring, said control means performs control such that the fuel injection quantity of the first fuel injection is increased.

10. The control apparatus for the direct injection type spark-ignition engine according to claim 9,
    wherein when based on a result obtained from the knocking detection means said control means judges that knocking is occurring, the control means performs control such that the fuel injection quantity of the first fuel injection is increased and the negative overlap period is extended.

11. A control apparatus for a direct injection type spark-ignition engine, the control apparatus comprising:
    control means for performing control so that fuel is injected dividedly at a plurality of times during the high-load operation of the spark-ignition engine, wherein first fuel injection is started at a point of time close to a top dead center at which an exhaust stroke ends, and wherein the injection of the whole amount of fuel required for one combustion cycle is completed before the timing at which an intake valve closes.

* * * * *